(12) United States Patent
Yoo et al.

(10) Patent No.: US 9,178,237 B2
(45) Date of Patent: Nov. 3, 2015

(54) CONDUCTIVE COMPOSITION AND METHOD OF PREPARATION, POLYMER THEREOF, AND ELECTRODE, ELECTROLYTE MEMBRANE AND FUEL CELL INCLUDING THE COMPOSITION OR POLYMER

(75) Inventors: Dae-jong Yoo, Seoul (KR); Seong-woo Choi, Yongin-si (KR); So-young Park, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 1076 days.

(21) Appl. No.: 13/242,972

(22) Filed: Sep. 23, 2011

(65) Prior Publication Data

US 2012/0148938 A1 Jun. 14, 2012

(30) Foreign Application Priority Data

Dec. 14, 2010 (KR) .................. 10-2010-0127863

(51) Int. Cl.
| | |
|---|---|
| H01M 8/10 | (2006.01) |
| H01M 8/00 | (2006.01) |
| C08G 73/06 | (2006.01) |
| C08G 73/22 | (2006.01) |
| C08J 5/22 | (2006.01) |
| C08L 79/04 | (2006.01) |
| H01B 1/12 | (2006.01) |
| H01M 4/86 | (2006.01) |
| H01M 8/02 | (2006.01) |
| H01M 4/92 | (2006.01) |

(52) U.S. Cl.
CPC ............. *H01M 8/1004* (2013.01); *C08G 73/06* (2013.01); *C08G 73/22* (2013.01); *C08J 5/2256* (2013.01); *C08L 79/04* (2013.01); *H01B 1/122* (2013.01); *H01M 4/8605* (2013.01); *H01M 8/0291* (2013.01); *H01M 8/103* (2013.01); *C08J 2379/06* (2013.01); *H01M 4/921* (2013.01); *Y02E 60/521* (2013.01)

(58) Field of Classification Search
USPC .......................................... 429/492, 523, 530
IPC .................. H01M 8/10,8/1016, 8/1018, 8/102, H01M 2008/1095
See application file for complete search history.

(56) References Cited

U.S. PATENT DOCUMENTS

| | | | | |
|---|---|---|---|---|
| 7,799,893 | B2 * | 9/2010 | Martin | 528/423 |
| 2003/0064279 | A1 | 4/2003 | Yoshida et al. | |
| 2005/0256296 | A1 | 11/2005 | Kiefer et al. | |
| 2007/0184323 | A1 * | 8/2007 | Lee et al. | 429/33 |
| 2007/0275285 | A1 | 11/2007 | Choi et al. | |
| 2008/0145743 | A1 * | 6/2008 | Choi et al. | 429/43 |

FOREIGN PATENT DOCUMENTS

| | | |
|---|---|---|
| EP | 1 760 110 | 8/2006 |
| EP | 2 202 261 A1 | 6/2010 |
| EP | 2 253 654 A1 | 11/2010 |
| JP | 2001-288339 | 10/2001 |
| JP | 2008-153192 | 7/2008 |
| KR | 10-2003-0027802 | 4/2003 |
| KR | 10-2005-0113996 | 12/2005 |
| KR | 10-2009-0080160 | 7/2009 |
| WO | WO 89/05803 | 6/1989 |
| WO | WO 01/34581 | 5/2001 |
| WO | WO 2010/018198 | 2/2010 |

OTHER PUBLICATIONS

Extended European Search Report for Application No. 11193043.4-2119 dated Apr. 4, 2012.

* cited by examiner

*Primary Examiner* — Patrick Ryan
*Assistant Examiner* — Julian Anthony
(74) *Attorney, Agent, or Firm* — Cantor Colburn LLP

(57) ABSTRACT

A conductive composition, a polymer obtained from the conductive composition, a method of preparing the composition, an electrode and electrolyte membrane of a fuel cell, each including at least one of the composition and the polymer, and a fuel cell including at least one of the composition and the polymer. The conductive composition includes at least one benzoxazine-based compound with a conductive functional group and a cross-linkable compound. A composition including a conductive functional group and a polymer that is a polymerization product of the composition demonstrates good resistance to chemicals, heat, and acid. An electrode for fuel cells that includes the same demonstrates improved electrical conductivity.

33 Claims, 5 Drawing Sheets

CONDUCTIVE COMPOSITION AND METHOD OF PREPARATION, POLYMER THEREOF, AND ELECTRODE, ELECTROLYTE MEMBRANE AND FUEL CELL INCLUDING THE COMPOSITION OR POLYMER

CROSS-REFERENCE TO RELATED APPLICATION

This application claims the benefit of Korean Patent Application No. 10-2010-0127863, filed on Dec. 14, 2010 in the Korean Intellectual Property Office, the entire contents of which are incorporated herein by reference.

BACKGROUND

1. Field

Aspects of the present invention relate to a conductive composition, a polymer thereof, a method of preparing the composition, an electrode and an electrolyte membrane for a fuel cell including the composition or the polymer, and a fuel cell including the same.

2. Description of the Related Art

Fuel cells are sources of future clean energy that are alternatives to fossil energy. Fuel cells also have high output density and high energy conversion efficiency, which means fuel cells are applicable in a vast range of fields such as in pollution-free vehicles, domestic power generating systems, and mobile electronic appliances such as mobile communication devices, medical equipment, and various devices for military and aerospace uses.

A fuel cell includes a cathode, an anode, and an electrolyte membrane disposed between the cathode and the anode. In the anode, to which fuel gas is supplied, oxidation of the fuel gas takes place. In the cathode, to which oxygen is supplied, reduction of oxygen occurs. Electrons generated from the reactions in the cathode and anode generate electricity, and collaterally generate heat and moisture.

Typically, such an electrode of the fuel cell includes a microporous layer consisting of carbon black and polytetrafluoroethylene. However, such an electrode may not lead to satisfactory conductivity characteristics, and thus improvement in this regard is necessary.

SUMMARY

Aspects of the present invention provide a conductive composition; polymers thereof; a method of preparing the conductive composition; an electrode and an electrolyte membrane for a fuel cell, each including the composition or the polymer; and a fuel cell including the same.

According to an aspect of the present invention, a composition includes at least one of a compound represented by Formula 1 below and a compound represented by Formula 2 below; and a cross-linkable compound:

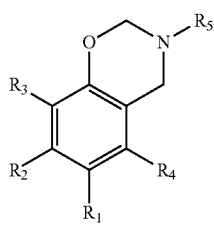

Formula 1

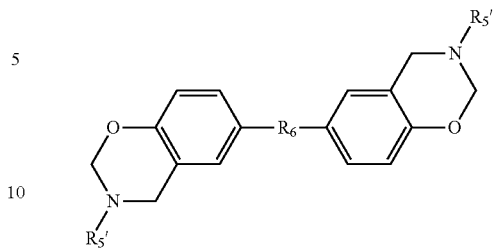

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and $R_5$ and $R_5'$ are each independently selected from the group consisting of a group represented by Formula 3 below, a group represented by Formula 4 below, —S≡N, and —C≡CH,

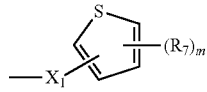

Formula 3

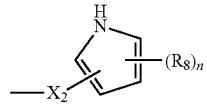

Formula 4 wherein, in Formulae 3 and 4, $X_1$ and $X_2$ are each independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

Another aspect of the present invention provides a polymer that is a polymerization product of the composition.

According to another aspect of the present invention, a method of preparing a composition includes thermally treating a mixture of a phenol compound (A) below, formaldehyde, an amine compound (B) below, an aprotic polar solvent and an organic solvent to obtain the at least one of the compounds of Formulae 1 and 2:

(A)

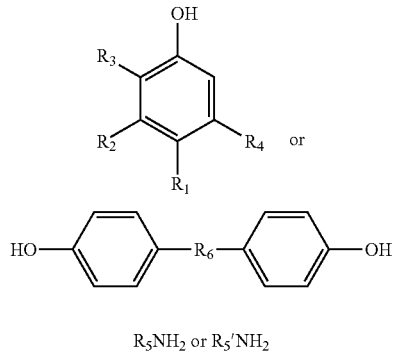

(B)

R₅NH₂ or R₅'NH₂

Formula 1

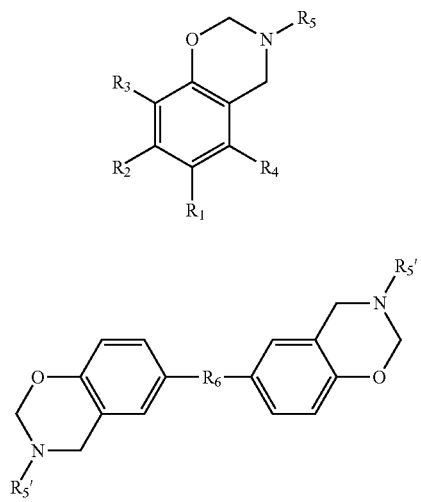

Formula 2 wherein, in Formulae 1 and 2 and in the formulae of the phenol compound (A) and the amine compound (B), $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxy group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO₂—; and $R_5$ and $R_5'$ are each independently selected from the group consisting of a group represented by Formula 3 below, a group represented by Formula 4 below, —S=N, and —C≡CH,

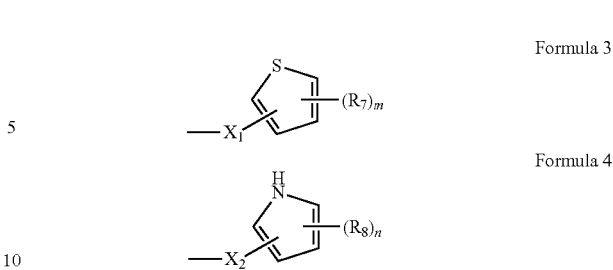

wherein, in Formulae 3 and 4, $X_1$ and $X_2$ are each independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

According to another aspect of the present invention, an electrode for a fuel cell includes the composition described above or the polymer described above.

According to another aspect of the present invention, an electrolyte membrane for a fuel cell includes the composition described above or the polymer described above.

According to another aspect of the present invention, a fuel cell includes: a cathode; an anode; and an electrolyte membrane disposed between the cathode and the anode, wherein at least one of the cathode, the anode and the electrolyte membrane includes the composition described above or the polymer described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
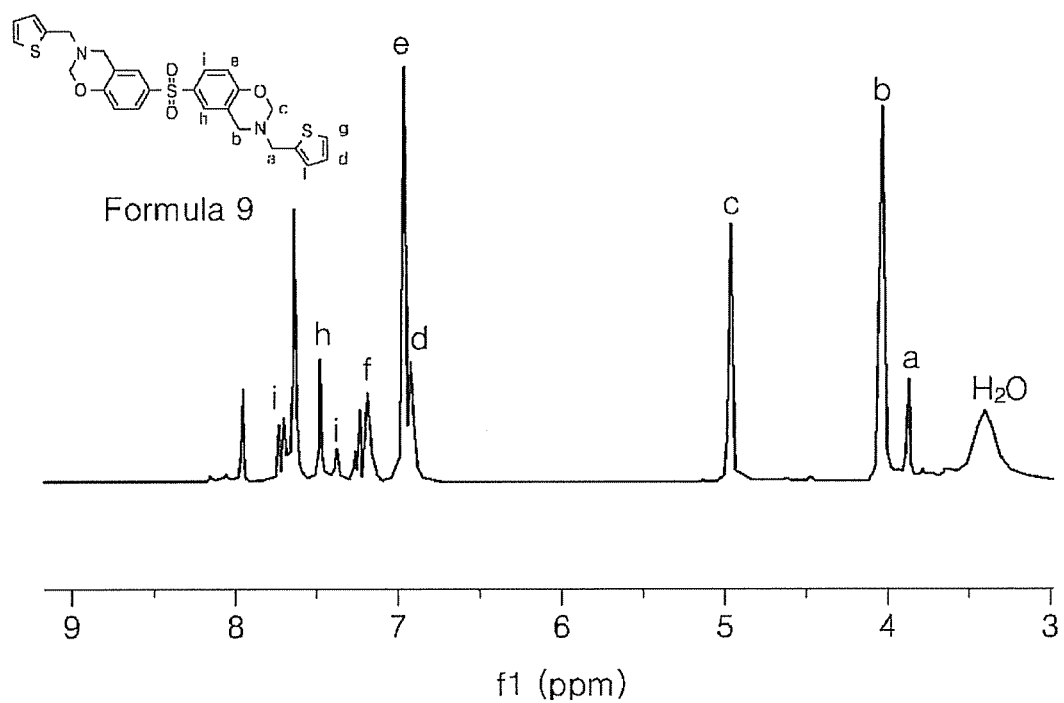
FIG. 1 shows a nuclear magnetic resonance (NMR) spectrum of a compound represented by Formula 9 and prepared according to Synthesis Example 1.

Reference will now be made in detail to the present embodiments of the present invention, examples of which are illustrated in the accompanying drawings. The embodiments are described below, to explain aspects of the present invention by referring to the figures.

An aspect of the present invention provides a composition including at least one of a compound represented by Formula 1 and a compound represented by Formula 2, and a cross-linkable compound.

Formula 1

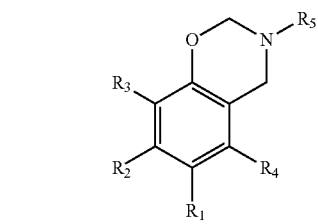

Formula 2

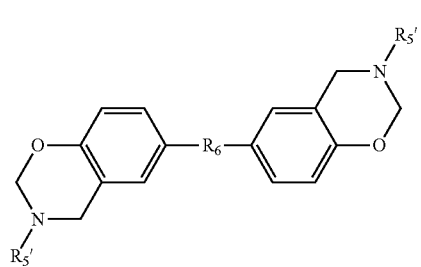

In Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—;

$R_5$ and $R_5'$ are conductive functional groups, each of which is selected from the group consisting of a group represented by Formula 3, a group represented by Formula 4, —S≡N, and —C≡CH, Formula 3

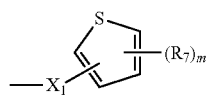

Formula 4

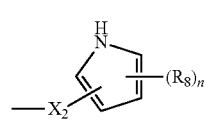

In Formulae 3 and 4, $X_1$ and $X_2$ are each independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ may be each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group;

m and n are each independently an integer from 0 to 3; and $R_5$ and $R_5'$ are each independently one of the groups represented by Formulae 5A-5C below:

Formula 5A

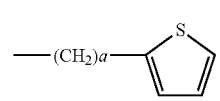

Formula 5B

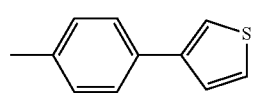

Formula 5C

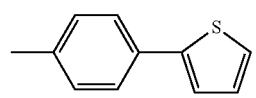

In Formula 5A, a is an integer from 1 to 5.

In Formulae 3 and 4, m and n are zero, and $(R_7)_0$ and $(R_8)_0$ are each a hydrogen atom.

Also, in Formulae 3 and 4, $X_1$ and $X_2$ may each be a methylene group, an ethylene group, a phenylene group, or the like.

When the composition includes both the compound of Formula 1 and the compound of Formula 2, the compound of Formula 2 may be from about 0.1 parts to about 100 parts by weight based on 100 parts by weight of the compound of Formula 1. Another aspect of the present invention provides a polymer that is a polymerization product of the composition described above.

The compounds of Formulae 1 and 2 may be resistant to chemicals, heat, and acid, and may have conductive characteristics due to the conductive functional groups therein.

The composition including at least one of the compounds of Formulae 1 and 2, and the polymer that is a polymerization product of the composition may be used when forming electrodes of fuel cells. The composition may further include a cross-linkable compound.

When used in a microporous layer, the composition and the polymer therefrom may improve the dispersibility and binding strength of components in the microporous layer, thereby preventing the microporous layer from cracking at a uniform thickness. The microporous layer may be used to form an electrode with good conductive characteristics.

Examples of the compound of Formula 2 include compounds represented by Formulae 6 to 8 below:

Formula 6
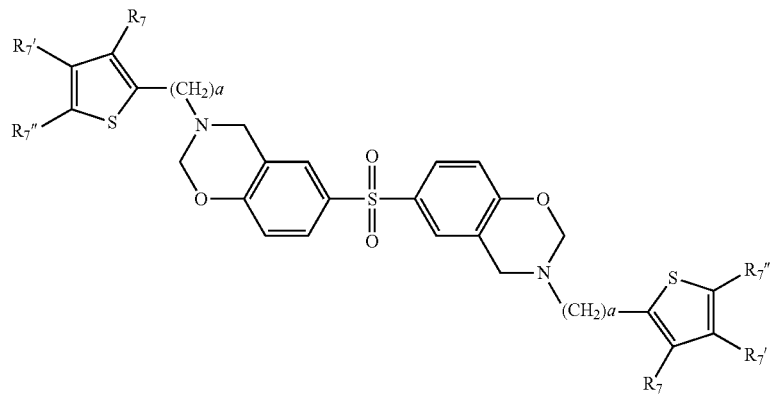
Formula 7
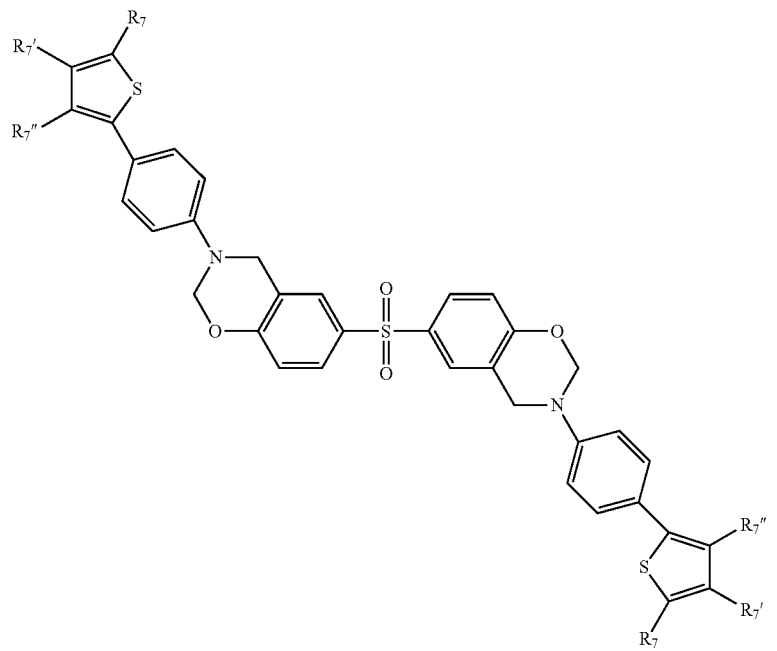
Formula 8
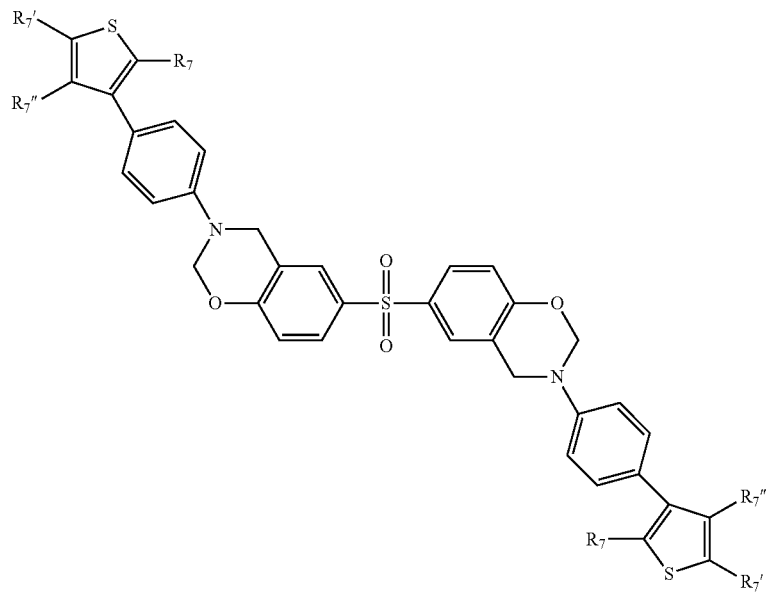

In Formulae 6-8, $R_7$, $R_7'$ and $R_7''$ are each independently a hydrogen atom, a $C_1$-$C_{20}$ alkyl group, a $C_6$-$C_{20}$ aryl group, a $C_2$-$C_{20}$ heteroaryl group, a $C_2$-$C_{20}$ heteroaryloxy group, a $C_4$-$C_{20}$ carbocyclic group, a $C_2$-$C_{20}$ heterocyclic group, a halogen atom, a hydroxyl group, or a cyano group; and in Formula 6, a is an integer from 1 to 5.

The compound of Formula 2 may include one of compounds represented by Formulae 9-11 and Formula 19 below.

Formula 9

Formula 10

Formula 11

-continued

Formula 19

The cross-linkable compound may include any compound with a functional group which may cross-link with at least one of the compounds of Formulae 1 and 2. Examples of the cross-linkable compound include any nitrogen-containing aromatic compound, including five-membered cyclic, nitrogen-containing aromatic compounds, and six-membered cyclic, nitrogen-containing aromatic compounds, such as polypyrimidine.

The cross-linkable compound may be at least one material selected from the group consisting of a polyazole-based material, polyoxazole and polyimide.

When a polyazole-based material is used as the cross-linkable compound, a final product may be a graft copolymer obtained from graft polymerization of a polymer of at least one of the compounds of Formulae 1 and 2, and the polyazole-based material. As used herein, the term "a polymerization product of at least one of the compounds of Formulae 1 and 2, and a polyazole-based material" is in reference to the graft copolymer described above.

The polyazole-based material indicates a polymer, a repeating unit of which includes at least one aryl ring having at least one nitrogen atom. The aryl ring may include a five-membered or six-membered atom ring with one to three nitrogen atoms that may be fused to another ring, for example, another aryl ring or heteroaryl ring. In this regard, the nitrogen atoms may be substituted with oxygen, phosphorus and/or sulfur atom. Examples of the aryl ring include phenyl, naphthyl, hexahydroindyl, indanyl, tetrahydronaphthyl, and the like.

The polyazole-based material may have at least one amino group in the repeating unit as described above. In this regard, the at least one amino group may be a primary, secondary or tertiary amino group which is either part of the aryl ring or part of a substituent of the aryl ring.

The term "amino group" indicates a group with nitrogen atom covalently bonded to at least one carbon or hetero atom. The amino group may refer to, for example, —$NH_2$ and substituted moieties.

The term "alkyl amino group" also refers to an "alkylamino group" with nitrogen bound to at least one additional alkyl group, and "arylamino" and "diarylamino" groups with at least one or two nitrogen atoms bound to a selected aryl group.

Methods of preparing the polyazole-based material and a polymer film including the polyazole-based material are disclosed in US 2005/256296A.

Examples of the polyazole-based material include polyazole-based materials represented by Formulae 21 to 34.

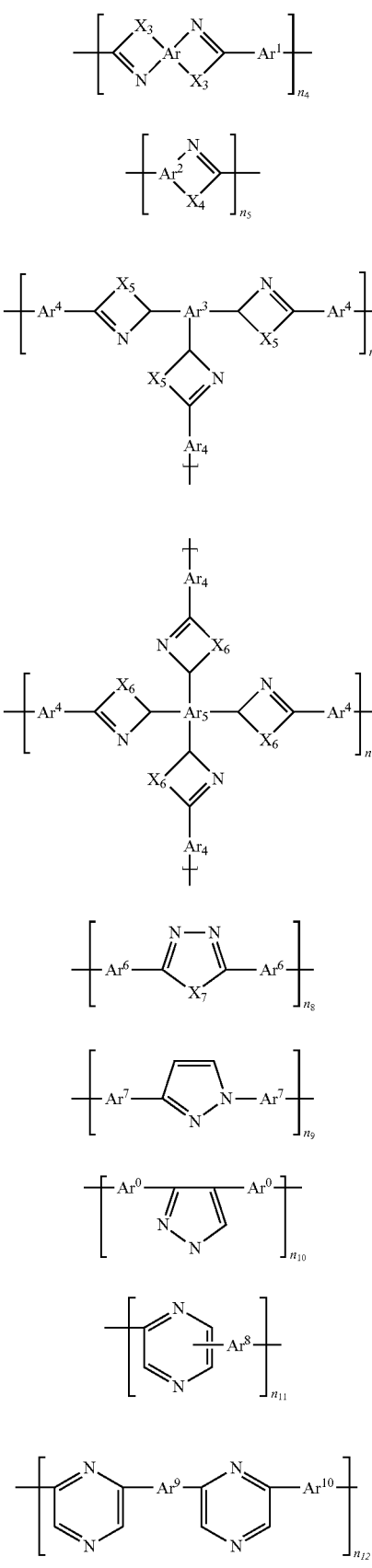

Formula 21
Formula 22
Formula 23
Formula 24
Formula 25
Formula 26
Formula 27
Formula 28
Formula 29

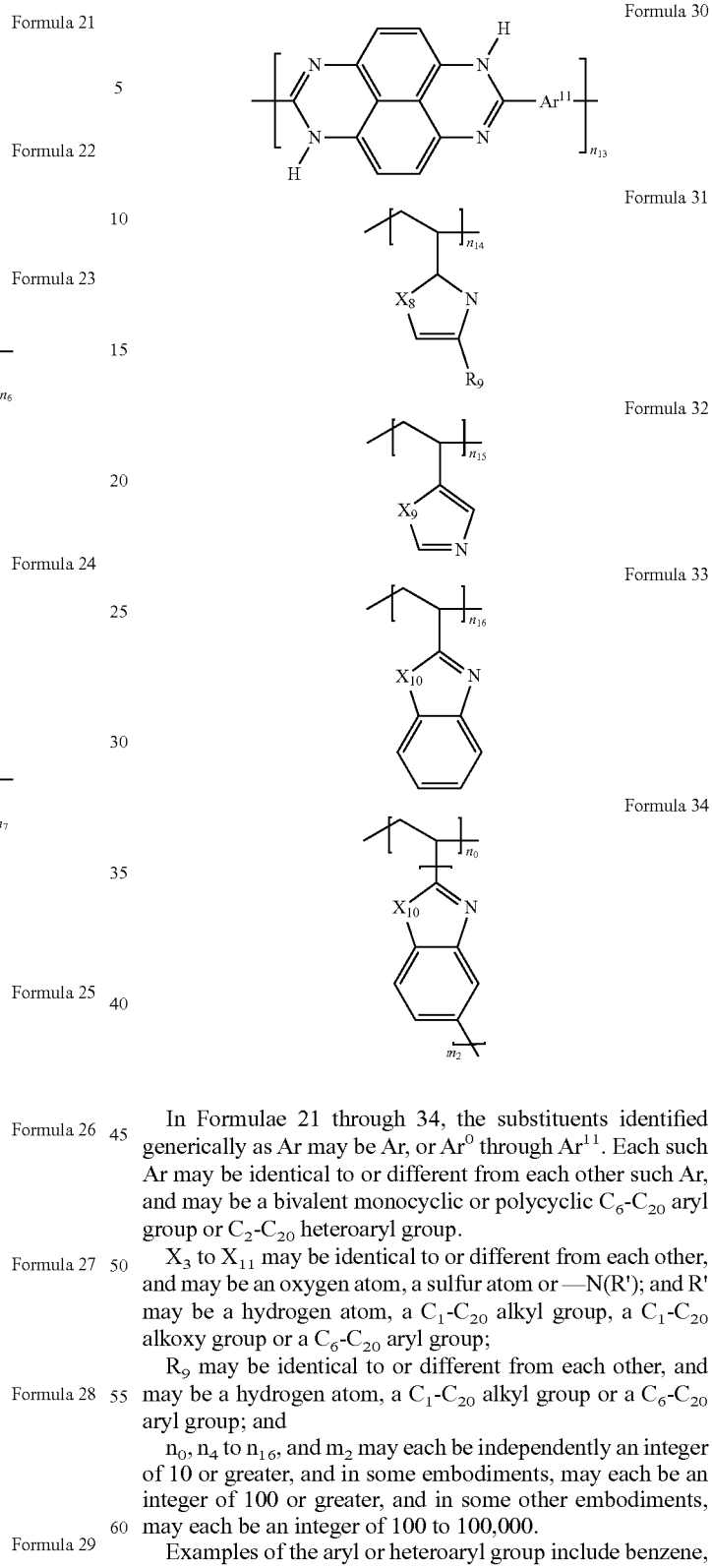

Formula 30
Formula 31
Formula 32
Formula 33
Formula 34

In Formulae 21 through 34, the substituents identified generically as Ar may be Ar, or $Ar^0$ through $Ar^{11}$. Each such Ar may be identical to or different from each other such Ar, and may be a bivalent monocyclic or polycyclic $C_6$-$C_{20}$ aryl group or $C_2$-$C_{20}$ heteroaryl group.

$X_3$ to $X_{11}$ may be identical to or different from each other, and may be an oxygen atom, a sulfur atom or —N(R'); and R' may be a hydrogen atom, a $C_1$-$C_{20}$ alkyl group, a $C_1$-$C_{20}$ alkoxy group or a $C_6$-$C_{20}$ aryl group;

$R_9$ may be identical to or different from each other, and may be a hydrogen atom, a $C_1$-$C_{20}$ alkyl group or a $C_6$-$C_{20}$ aryl group; and $n_0$, $n_4$ to $n_{16}$, and $m_2$ may each be independently an integer of 10 or greater, and in some embodiments, may each be an integer of 100 or greater, and in some other embodiments, may each be an integer of 100 to 100,000.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyrimidine, imidazopyrimidine, pyrazinopyrimidine, carbazole, aziridine, phenazine, benzoquinoline, phenoxazine, phenothiazine, acridizine, benzopteridine, phenanthroline and phenanthrene, wherein these aryl or heteroaryl groups may have a substituent.

$Ar^1$, $Ar^4$, $Ar^6$, $Ar^7$, $Ar^8$, $Ar^9$, $Ar^{10}$, and $Ar^{11}$ defined above may have any substitutable pattern. For example, if $Ar^1$, $Ar^4$, $Ar^6$, $Ar^7$, $Ar^8$, $Ar^9$, $Ar^{10}$, and $Ar^{11}$ are phenylene, $Ar^1$, $Ar^4$, $Ar^6$, $Ar^7$, $Ar^8$, $Ar^9$, $Ar^{10}$ and $Ar^{11}$ may be ortho-phenylene, meta-phenylene or para-phenylene.

The alkyl group may be a $C_1$-$C_4$ short-chain alkyl group, such as methyl, ethyl, n-propyl, i-propyl or t-butyl. The aryl group may be, for example, a phenyl group or a naphthyl group.

Examples of the substituents include a halogen atom, such as fluorine, an amino group, a hydroxyl group, and a short-chain alkyl group, such as methyl or ethyl.

Examples of the polyazole-based material include polyimidazole, polybenzothiazole, polybenzoxazole, polyoxadiazole, polyquinoxaline, polythiadiazole, polypyridine, polypyrimidine, and polytetrazapyrene.

The polyazole-based material may include a copolymer or blend including at least two units selected from the group consisting of units represented by Formulae 21 to 34 above. The polyazole-based material may include a block copolymer (di-block or tri-block), a random copolymer, a periodic copolymer or an alternating polymer including at least two units selected from the units of Formulae 21 to 34.

In some embodiments, the polyazole-based material may include only at least one of the units represented by Formulae 21 and 22.

Examples of the polyazole-based material include polymers represented by Formulae 35 to 61 below:

Formula 35

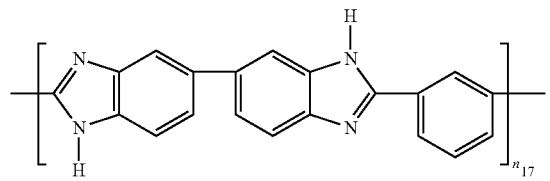

Formula 36

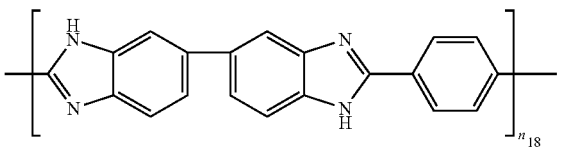

Formula 37

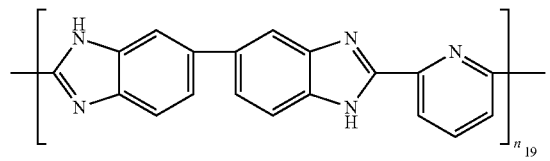

Formula 38

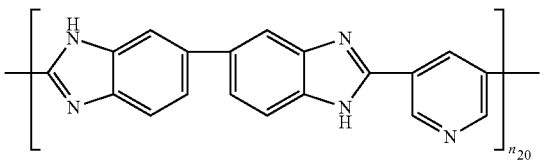

Formula 39

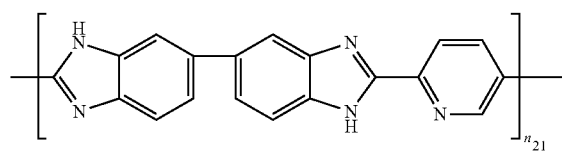

Formula 40

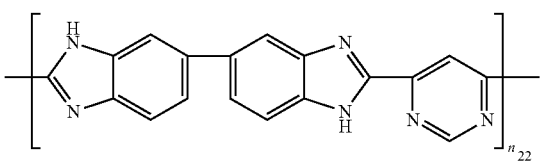

Formula 41

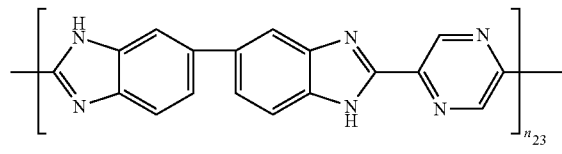

Formula 42

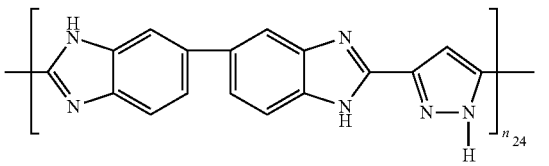

Formula 43

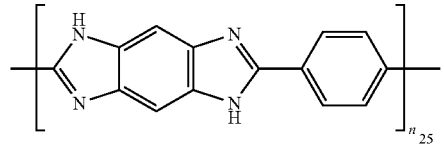

Formula 44

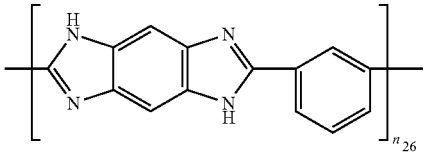

Formula 45

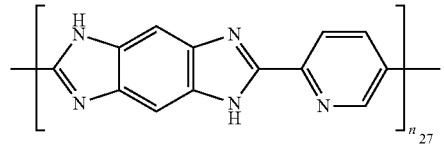

Formula 46

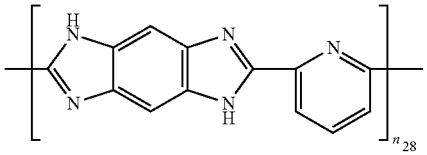

-continued
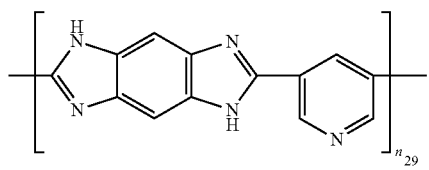
Formula 47
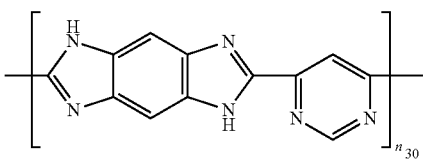
Formula 48
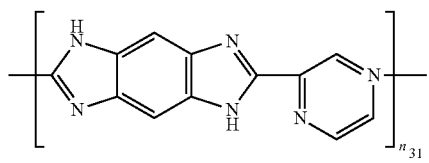
Formula 49
Formula 50
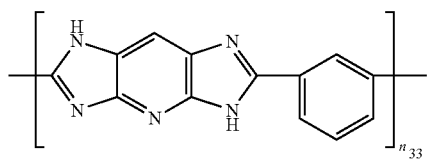
Formula 51
Formula 52
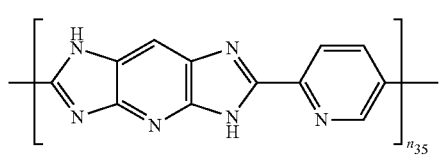
Formula 53
Formula 54
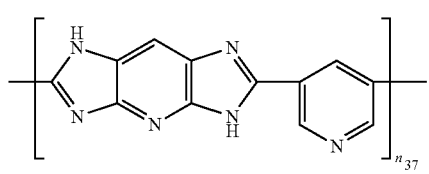
Formula 55
Formula 56
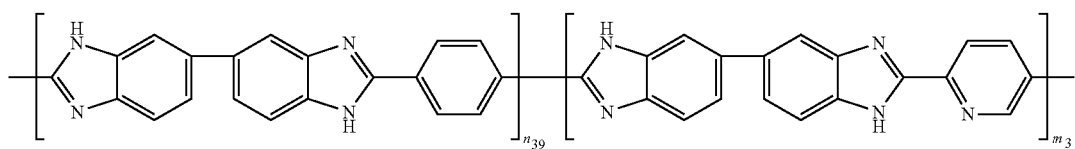
Formula 57
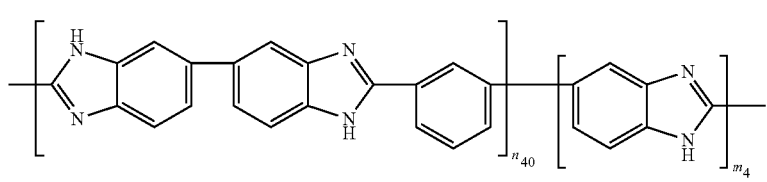
Formula 58
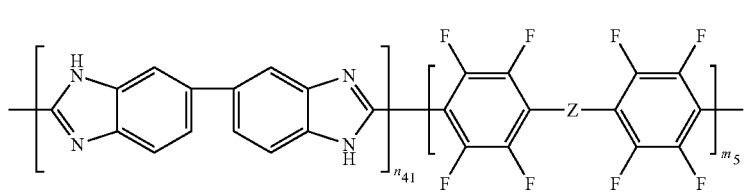
Formula 59

-continued

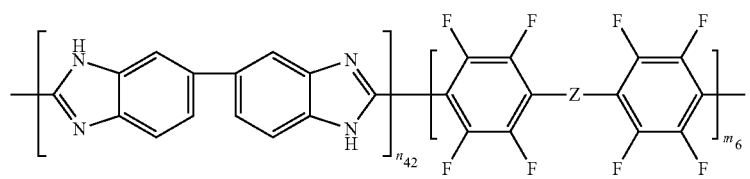

Formula 60

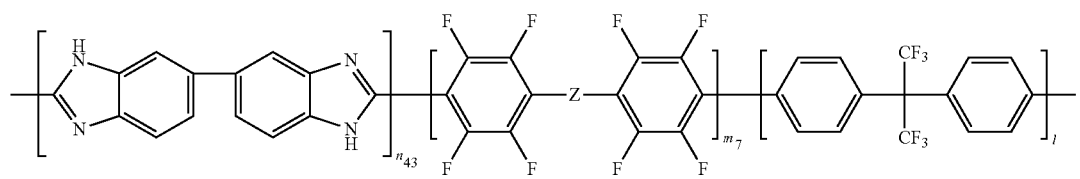

Formula 61

In Formulae 35 to 61, l, $n_{17}$ to $n_{43}$, and $m_3$ to $m_7$ may each be an integer of 10 or greater, and in some embodiments, may be an integer of 100 or greater, z may be a chemical bond, $-(CH_2)_s-$, $-C(=O)-$, $-SO_2-$, $-C(CH_3)_2-$, or $-C(CF_3)_2-$; and s may be an integer from 1 to 5.

The polyazole-based material may include a compound including m-polybenzimidazole (PBI) represented by Formula 12 below, or compound including p-PBI represented by Formula 13 below.

Formula 12

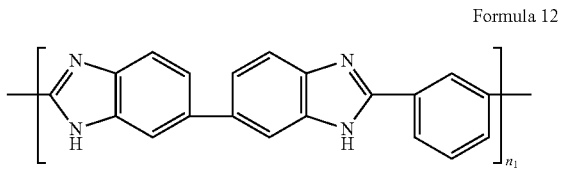

In Formula 12, $n_1$ is an integer of 10 or greater;

Formula 13

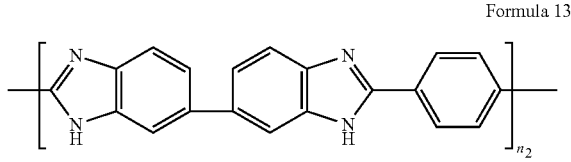

In Formula 13, $n_2$ is an integer of 10 or greater.

The compounds of Formulae 12 and 13 may each have a number average molecular weight of 1,000,000 or less.

For example, the polyazole-based material may include a benzimidazole-based polymer represented by Formula 14 below.

In Formula 14, $R_9$ and $R_{10}$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, wherein $R_9$ and $R_{10}$ may be linked to form a $C_4$-$C_{20}$ carbocyclic group or a $C_3$-$C_{20}$ heterocyclic group;

$Ar^{12}$ is a substituted or unsubstituted $C_6$-$C_{20}$ arylene group or a substituted or unsubstituted $C_3$-$C_{20}$ heteroarylene group;

$R_{11}$ to $R_{13}$ are each independently a mono- or a multi-substituted substituent selected from the group consisting of a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, and a substituted or unsubstituted $C_3$-$C_{20}$ heteroaryloxy group.

L represents a linker;

$m_1$ is from 0.01 to 1;

$a_1$ is 0 or 1;

$n_3$ is a number from 0 to 0.99; and k is a number from 10 to 250.

The benzimidazole-based polymer may include a compound represented by Formula 15 below or a compound represented by Formula 16 below:

Formula 14

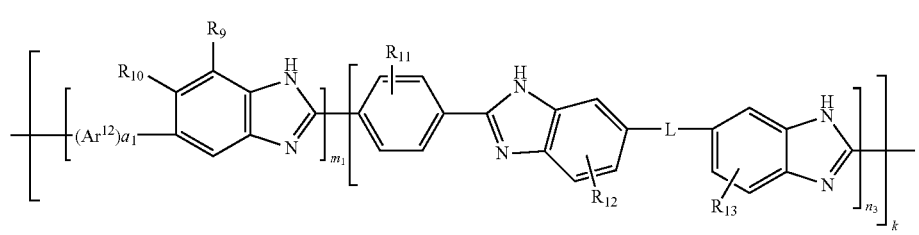

Formula 15

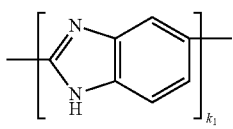

In Formula 15, $k_1$ represents the degree of polymerization and is a number from 10 to 300.

Formula 16

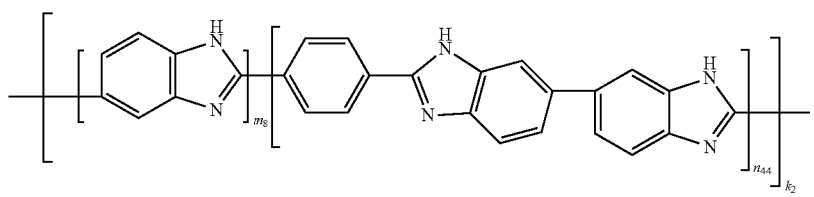

In Formula 16, $m_8$ is a number from 0.01 to 1, and in some embodiments, may be a number from 1 or a number from 0.1 to 0.9; and $n_{44}$ is a number from 0 to 0.99, and in some embodiments, may be 0 or a number from 0.1 to 0.9; and $k_2$ is a number from 10 to 250.

When at least one of the compounds of Formulae 1 and 2 is polymerized with the polyazole-based compound, the amount of the cross-linkable compound may be from about 5 parts to about 210 parts by weight, and in some embodiments, may be from about 40 parts to about 210 parts by weight based on 100 parts by weight of the at least one of the compounds of Formulae 1 and 2. When the amount of the cross-linkable compound is within these ranges, proton conductivity of a polymer obtained from the polymerization may be good.

Hereinafter, a method of preparing the composition including at least one of the compounds of Formulae 1 and 2, according to an embodiment of the present invention, will be described. First, at least one of the compounds of Formulae 1 and 2 is synthesized. Subsequently, if required, the compound of Formula 1 obtained according to the above-described process and the compound of Formula 2 may be mixed together to obtain a target composition. The amount of the compound of Formula 2 may be from about 0.01 parts to about 100 parts by weight based on 100 parts by weight of the compound of Formula 1.

A method of preparing at least one of the compounds of Formula 1 and 2 will now be described below. A phenol compound (A), formaldehyde, and an amine compound (B) are mixed together, and are then thermally treated.

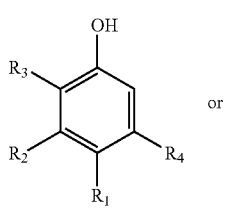

(A)

or

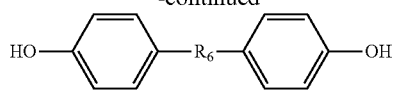

(B)

$R_5NH_2$ or $R_5'NH_2$

Formula 1

Formula 2

In Formulae 1 and 2 and the formulae of the phenol compound (A) and the amine compound (B), $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—;

$R_5$ and $R_5'$ are conductive functional groups, each of which is independently selected from among a group represented by Formula 3, a group represented by Formula 4, —S≡N, and —C≡CH,

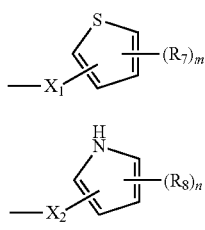

Formula 3

Formula 4

In Formulae 3 and 4, $X_1$ and $X_2$ may each be independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ may each be independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

When the phenol compound (A), the formaldehyde, and the amine compound (B) are mixed together, an aprotic polar solvent and an organic solvent may be added. The order of adding and mixing the phenol compound (A), formaldehyde, the amine compound (B), the aprotic polar solvent, and the organic solvent is not specifically limited. The order of adding the aprotic polar solvent and the organic solvent to the phenol compound (A), formaldehyde, and the amine compound (B) is also not specifically limited. In one embodiment, the aprotic solvent and the organic solvent may be added to a mixture of formaldehyde and the amine compound (B), and then the phenol compound (A) may be added thereto and the combination mixed together.

The addition of the aprotic polar solvent and the organic solvent as described above enables the phenol compound (A), the formaldehyde, and the amine compound (B) to be uniformly mixed, obtaining at least one of the compounds of Formulae 1 and 2 with a high yield. If the aprotic polar solvent is not used to mix the phenol compound (A), formaldehyde, and the amine compound (B) together, it may be difficult to obtain at least one of the compounds of Formulae 1 and 2.

The aprotic polar solvent may include at least one solvent selected from the group consisting of N,N'-dimethylformamide, N,N'-diacetamide, N-methylpyrrolidone, tetraethylenesulfone, 1,2-dimethyl-2-imidazolidinone, and N-methylformamide.

The organic solvent may include 1,4-dioxane, chloroform, dichloromethane, tetrahydrofuran (THF), a benzene-based solvent, or a mixture thereof.

In one embodiment, the organic solvent may include a benzene-based solvent. The benzene-based solvent may include at least one solvent selected from among benzene, toluene and xylene.

The mixing ratio of the aprotic polar solvent to the organic solvent may be from about 1:9 to about 9:1 by volume, and in some embodiments, may be from about 1:5 to about 5:1 by volume. In one embodiment, the mixing ratio of the aprotic polar solvent to the organic solvent may be about 1:3 by volume.

When the phenol compound (A), formaldehyde, and the amine compound (B) are mixed together, at least one catalyst selected from among p-toluenesulfonic acid, phosphorus pentachloride ($PCl_5$), and phosphoryl chloride ($POCl_3$) may be further added. The amount of the catalyst may be from about $10^{-6}$ mol to about $5 \times 10^{-1}$ mol based on 1 mol of the phenol compound (A). When the amount of the catalyst is within this range, at least one of the compounds of Formulae 1 and 2 may be obtained with a high yield.

The thermal treatment may be performed at a temperature of about 80° C. to about 25° C.

The amount of the formaldehyde may be from about 2 moles to about 5 moles, and in some embodiments, may be about 4.4 moles, based on 1 mol of the phenol compound (A). The amount of the amine compound (B) may be from about 1 mol to about 4 moles, and in some embodiments, may be about 2.2 moles, based on 1 mol of the phenol compound (A). When the amounts of the formaldehyde and the amine compound (B) are within these respective ranges, at least one of the compounds of Formulae 1 and 2 may be obtained with a high yield.

Hereinafter, a method of preparing a polymer of at least one of the compounds of Formulae 1 and 2, according to an embodiment of the present invention, will be described. In this regard, a non-limiting exemplary method of preparing a compound represented by Formula 6 below, which is an example of the compound of Formula 2, will be described.

The compound represented by Formula 6 below may be prepared through reaction of the phenol compound (A), the formaldehyde, and the amine compound (B), as illustrated in Reaction Scheme 1 below. The reaction is performed under conditions in which a mixed solvent of an aprotic polar solvent and an organic solvent is used.

When the phenol compound (A), the formaldehyde, and the amine compound (B) react, one catalyst selected from among p-toluenesulfonic acid, phosphorus pentachloride ($PCl_5$), and phosphoryl chloride ($POCl_3$) may be further added.

The same kinds and same amounts of aprotic polar solvents and organic solvents as described above may be used. The same amount of catalyst as described above may be used.

The reaction temperature may be from about 80° C. to about 150° C.

Reaction Scheme 1

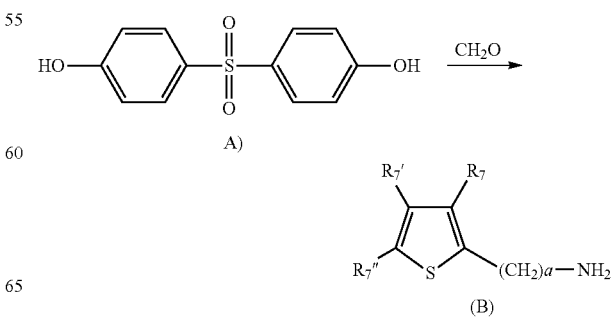

Formula 6

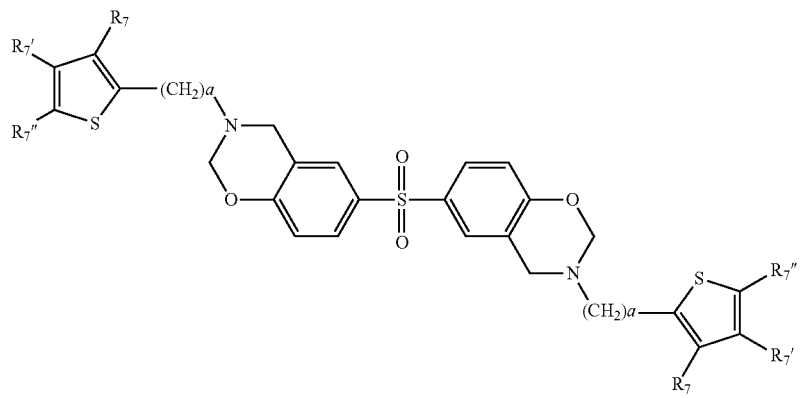

In Reaction Scheme 1 and Formula 6 above, $R_7$, $R_7'$, and $R_7''$ are each independently a hydrogen atom, a $C_1$-$C_{20}$ alkyl group, a $C_6$-$C_{20}$ aryl group, a $C_2$-$C_{20}$ heteroaryl group, a substituted or non-substituted $C_2$-$C_{20}$ heteroaryloxy group, a $C_4$-$C_{20}$ carbocyclic group, a $C_2$-$C_{20}$ heterocyclic group, a halogen atom, a hydroxyl group, an amino group, or a cyano group; and a is an integer from 1 to 5.

In Reaction Scheme 1 above, the amount of the formaldehyde may be from about 2 moles to about 5 moles, and in some embodiments, may be about 4.4 moles, based on 1 mol of the phenol compound (A). The amount of the amine compound (B) may be from about 1 mol to about 4 moles, and in some embodiments, may be about 2.2 moles, based on 1 mol of the phenol compound (A). When the amounts of the formaldehyde and the amine compound (B) are within these respective ranges, the compound of Formula 6 may be obtained with a high yield.

The compound of Formula 1 above may also be synthesized in a similar method in which the compound of Formula 6, an example of the compound of Formula 2, is synthesized.

In some embodiments the polymer that is a polymerization product of the composition may include a compound represented by Formula 17 below. The compound of Formula 17 may be part of the polymer.

Formula 17

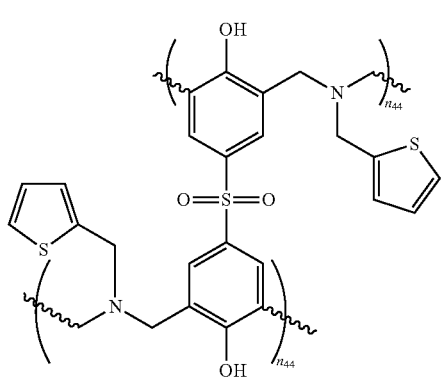

In Formula 17, $n_{44}$ is an integer from 5 to 200.

At least one of the composition and the polymer obtained therefrom are useful as an electrode additive for fuel cells. An electrode for fuel cells may have a structure including a catalyst layer and a gas diffusion layer (GDL). A microporous layer may be further disposed between the GDL and the catalyst layer. The microporous layer may reduce contact resistance of the gas diffusion layer with respect to the catalyst layer and may facilitate gas permeation and discharge of water, which is a byproduct from the reaction.

According to another aspect of the present invention, an electrode for fuel cells includes a gas diffusion layer and a microporous layer, and a catalyst layer; and the at least one of the gas diffusion layer, the microporous layer and the catalyst layer comprises at least one of the compositions described above and the polymer that is a polymerization product of at least one of the compositions represented by Formulae 1 and 2. For example, the at least one of the gas diffusion layer, the microporous layer and the catalyst layer contains the polymer.

According to another aspect of the present invention, an electrode for fuel cells includes at least one of a microporous layer and a catalyst, for example, a microporous layer or a catalyst layer that contains at least one of the compositions described above and the polymer that is a polymerization product of at least one of the compositions represented by Formulae 1 and 2. For example, the microporous layer or the catalyst layer contains the polymer.

According to another aspect of the present invention, an electrode for fuel cells includes a gas diffusion layer and a microporous layer, and a catalyst layer; and the gas diffusion layer and the microporous layer contain at least one of the compositions described above and the polymer that is a polymerization product of at least one of the compositions represented by Formulae 1 and 2. For example, the gas diffusion layer and the microporous layer contain the polymer.

The composition including at least one of the compounds of Formulae 1 and 2 may further include a cross-linkable compound.

First, a method of manufacturing an electrode for fuel cells that includes a catalyst layer, a microporous layer, and a GDL will be described in detail. For an electrode that does not include a microporous layer, the catalyst layer may be directly formed on the GDL.

The microporous layer may include a conductive material, and at least one of the compositions described above and the polymer that is a polymerization product of the composition.

At least one of the composition and the polymer obtained therefrom may be from about 0.1 parts to about 0.5 parts by weight based on 1 part by weight of the conductive material. When the amount of the at least one of the composition and the polymer is within this range, the conductive material may be effectively bound in the conductive layer, thus reducing resistance of the electrode. The conductive material may include carbon black, graphite, glass carbon, activated charcoal, carbon fiber, activated carbon, carbon aerogel, or a mixture thereof.

A method of forming the microporous layer is as follows. First, the conductive material is dispersed or dissolved in a solvent to prepare a mixture A. Examples of the solvent include ethylene glycol, methanol, ethanol, isopropanol, N-methylpyrolidone (NMP), N,N-dimethylacetamide (DMAc), and the like. The amount of the solvent may be from about 200 parts to about 500 parts by weight based on 100 parts by weight of the conductive material. When the amount of the solvent is within this range, good workability in forming the microporous layer may be achieved.

Meanwhile, at least one of the compounds of Formulae 1 and 2 is dispersed or dissolved in a solvent to obtain a mixture B. A cross-linkable compound may be further added to the mixture B. The solvent may include N-methylpyrolidone (NMP), N,N-dimethylacetamide (DMAc), or the like.

The amount of the solvent may be from about 1,000 parts to about 2,000 parts by weight based on 100 parts by weight of at least one of the compounds of Formulae 1 and 2. When the amount of the solvent is within this range, this may lead to good workability in forming the microporous layer.

The mixture A and the mixture B are mixed together to obtain a mixture, which is coated on the GDL. Non-limiting examples of the coating method include bar coating, tape casting, screen printing, and the like.

A porous carbon support may be used as the GDL. Examples of the porous carbon support include carbon paper, carbon cloth, and the like.

The resulting structure with the mixture coated on the GDL is optionally thermally heated to form the microporous layer. The thermal treatment temperature may be from about 200° C. to about 270° C.

The microporous layer formed according to the processes described above may have a thickness of about 30 nm to about 80 nm, and an electrical resistance of about 12 $\Omega cm^2/cm$ to about 14 $\Omega cm^2/cm$.

Then, the catalyst layer is formed on the microporous layer, thereby completing the manufacture of the electrode for fuel cells. The catalyst layer includes a catalyst. The catalyst may be platinum (Pt), an alloy or a mixture of Pt and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). The Pt, the alloy, or the mixture may be supported on a carbonaceous support.

The catalyst layer of the electrode may further include a binder. The binder may include at least one selected from the group consisting of poly(vinylidenefluoride), polytetrafluoroethylene (PTFE), a tetrafluoroethylene-hexafluoroethylene copolymer, and polyurethane.

In some embodiments the binder may include at least one of the composition described above and the polymer obtained therefrom, wherein the composition includes at least one of the compounds of Formulae 1 and 2, as described above.

The composition may further include a binder. As described above, when at least one of the compositions described above, including at least one of the compounds of Formulae 1 and 2, and the polymer that is a polymerization product of the compositions is used to form the microporous layer and the catalyst layer, a uniform electrode with increased dispersibility and binding strength of the conductive material may be formed.

The amount of the binder may be from about 0.001 parts to about 0.5 parts by weight, and in some embodiments, may be from about 0.01 parts to about 0.1 parts by weight, based on 1 part by weight of the catalyst. When the amount of the binder is within these ranges, the electrical conductivity of the electrode may be improved with increased binding strength of the conductive material in the electrode.

The catalyst layer of the electrode for fuel cells may be manufactured using any of various known methods. A non-limiting exemplary method of forming the catalyst layer is as follows. First, a catalyst is dispersed in a solvent. The solvent may include N-methylpyrrolidone (NMP), dimethylacetamide (DMAc), or the like. The amount of the solvent may be from about 1 part to about 10 parts by weight based on 1 part by weight of the catalyst.

A mixture of a solvent and at least one of the compounds of Formulae 1 and 2 is added to the dispersion and then stirred to obtain a coating solution. A binder may be further added to the coating solution. In one embodiment, a polyazole-based material may be further added to the coating solution.

The solvent may include N-methylpyrrolidone (NMP), N,N-dimethylacetamide (DMAC), or the like. The amount of at least one of the compounds of Formulae 1 and 2 may be from about 0.001 parts to about 0.5 parts by weight based on 1 part by weight of the catalyst. When a common binder is used along with at least one of the compounds of Formulae 1 and 2, the amount of the at least one of the compounds of Formulae 1 and 2 may be from about 0.001 parts to about 0.1 parts by weight based on 1 part by weight of the catalyst. When the amount of the at least one of the compounds of Formulae 1 and 2 is within this range, the electrode may have improved conductive characteristics.

The coating solution is coated on a surface of the microporous layer, and dried, thereby completing the manufacture of the electrode. For an electrode that does not include the microporous layer, the catalyst layer may be formed directly on the GDL.

The method of coating the coating solution is not particularly limited. Examples of the coating method include coating using a doctor blade, bar coating, screen printing, and the like.

After the coating solution has been coated on the surface of the microporous layer, the resulting structure is dried at a temperature of from about 20° C. to about 150° C. to remove the solvent. The drying time may vary depending on the drying temperature. In some embodiments the drying time may be from about 10 minutes to about 120 minutes.

The catalyst layer for the electrode may be formed in another way. That is, rather than being directly coated on the surface of the microporous layer or the GDL, the coating solution may be coated on a separate support, dried, and separated from the support to prepare a catalyst layer, which may be then placed on the microporous layer or the GDL, thereby completing the manufacture of the electrode. The catalyst layer for the electrode may also be formed using at least one of the compositions described above and the polymer obtained therefrom.

A method of manufacturing a fuel cell including the electrode described above will be described below. Any electrolyte membrane that is commonly used in fuel cells may be used. Suitable examples of electrolyte membranes include a polybenzimidazole electrolyte membrane, a polybenzoxazine-polybenzimidazole copolymer electrolyte membrane, a porous PTFE membrane, a fluorosulfonic acid-base membrane, a sulfone-based hydrocarbon membrane, and an electrolyte membrane as disclosed in US Patent Application Publication No. 20070275285A.

In a similar way to the electrode, the electrolyte membrane may include the polymer obtained from the polymerization product of the composition including at least one of the compounds of Formulae 1 and 2.

The electrolyte membrane may further include a proton conductor. Examples of the proton conductor include polyphosphoric acid ($H_3PO_3$), phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid, and a derivative thereof. The concentration of the proton conductor may be from about 80 wt % to about 98 wt %, and in some embodiments, may be 80 wt %, 90 wt %, 95 wt %, or 98 wt %.

An electrolyte membrane may be manufactured using the polymer obtained from polymerization of the at least one of the compounds of Formulae 1 and 2, according to a method disclosed in US Patent Application Publication No. 20070275285A.

Substituents in the formulae above may be defined as follows.

As used herein, the term "alkyl" refers to a fully saturated branched or unbranched (or straight chain or linear) hydrocarbon moiety. Examples of the alkyl group used herein include, but are not limited to, methyl, ethyl, n-propyl, isopropyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$ and $CCl_3$), a $C_1$-$C_{20}$ alkoxy, a $C_2$-$C_{20}$ alkoxyalkyl, a hydroxy group, a nitro group, a cyano group, an amino group, an amidino group, a hydrazine, a hydrazone, a carboxyl group or a salt thereof, a sulfonyl group, a sulfamoyl, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

As used herein, the term "halogen atom" refers to fluoro, bromo, chloro, or iodo.

As used herein, the term "a $C_1$-$C_{20}$ alkyl group substituted with a halogen atom" refers to a $C_1$-$C_{20}$ alkyl group that is substituted with one or more halo groups, and unlimited examples of a $C_1$-$C_{20}$ alkyl group that is substituted with one or more halo groups are monohaloalkyl, dihaloalkyl, and polyhaloalkyl including perhaloalkyl. A monohaloalkyl has one iodo, bromo, chloro or fluoro within the alkyl group, and dihaloalky and polyhaloalkyl groups have two or more of the same halo atoms or a combination of different halo groups within the alkyl.

As used herein, the term "alkoxy" refers to alkyl-O—, wherein alkyl is defined herein above. Examples of alkoxy include, but are not limited to, methoxy, ethoxy, propoxy, 2-propoxy, butoxy, tert-butoxy, pentyloxy, hexyloxy, cyclopropyloxy-, cyclohexyloxy- and the like. At least one hydrogen atom of the alkoxy group may be substituted with one of the same substituents as described above in connection with the alkyl group.

The term alkoxyalkyl refers to an alkyl group, as defined above, in which the alkyl group is substituted with alkoxy. At least one hydrogen atom of the alkoxyalkyl group may be substituted with the same substituent as described above in connection with the alkyl group. The term alkoxyalkyl includes a substituted alkoxyalkyl moiety.

The term "alkenyl" refers to a branched or unbranched hydrocarbon having at least one carbon-carbon double bond. Examples of alkenyl are, but are not limited to, vinyl, allyl, butenyl, isopropenyl or isobutenyl. At least one hydrogen atom of the alkenyl group may be substituted with one of the same substituents as described above in connection with the alkyl group.

The term "alkynyl" refers to a branched or unbranched hydrocarbon having at least one carbon-carbon triple bond. Examples of alkynyl are, but are not limited to, ethynyl, butynyl, isobutynyl or isopropynyl. At least one hydrogen atom of alkynyl may be substituted with one of the same substituents as described above in connection with the alkyl group.

The term "aryl" is used alone or in combination, and refers to an aromatic hydrocarbon group having one or more rings. The term "aryl" also refers to a group in which an aromatic ring is fused to one or more cycloalkyl rings. Examples of aryl are, but are not limited to, phenyl, naphthyl, or tetrahydronaphthyl. At least one hydrogen atom of aryl may be substituted with one of the same substituents as described above in connection with the alkyl group.

The term "arylalkyl" is an alkyl substituted with aryl. Examples of arylalkyl are benzyl or phenyl-$CH_2CH_2$—.

The term "aryloxy" includes an —O-aryl, wherein aryl is defined herein. Examples of aryloxy are phenoxy and the like. At least one hydrogen atom of aryloxy may be substituted with the same substituent as described above in connection with the alkyl group.

The term "heteroaryl" refers to a monocyclic or bicyclic organic compound that contains one or more hetero atoms selected from N, O, P, and S, and the remaining ring atoms are carbon atoms. The heteroaryl may include, for example, 1 to 5 hetero atoms, and 5 to 10 ring members. S or N may be oxidized to various oxidation states.

Typical monocyclic heteroaryl groups include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2yl, pyrazin-4-yl, pyrazin-5-yl, 2-pyrimidin-2-yl, 4-pyrimidin-2-yl, and 5-pyrimidin-2-yl.

The term "heteroaryl" also refer to a group in which a heteroaromatic ring is fused to one or more aryl, cycloaliphatic, or heterocyclic rings. Examples of bicyclic heteroaryl are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinoxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]

pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl. At least one hydrogen atom in the heteroaryl group may be substituted with one of the same substituents as described above in connection with the alkyl group.

The term "heteroarylalkyl" refers to alkyl substituted with heteroaryl.

The term "heteroaryloxy" includes an —O-heteroaryl moiety. At least one hydrogen atom in heteroaryloxy may be substituted with one of the same substituents as described above in connection with the alkyl group.

The term "heteraryloxyalkyl" refers to an alkyl group that is substituted with heteroaryloxy. At least one hydrogen atom in heteraryloxyalkyl may be substituted with the same substituent as described above in connection with the alkyl group.

As used herein, the term "carbocyclic" refers to saturated or partially unsaturated but non-aromatic monocyclic, bicyclic or tricyclic hydrocarbon groups. Exemplary monocyclic hydrocarbon groups include cyclopentyl, cyclopentenyl, cyclohexyl and cyclohexenyl. Exemplary bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl. Exemplary tricyclic hydrocarbon groups include adamantyl. At least one hydrogen atom in carbocyclic may be substituted with one of the same substituents as described above in connection with the alkyl group.

The term "heterocyclic" refers to a ring containing 5-10 ring atoms including a hetero atom such as N, S, P, or O, and an example of heterocyclic is pyridyl. At least one hydrogen atom in heterocyclic may be substituted with one of the same substituents as described above in connection with the alkyl group.

The term "heterocyclicoxy" includes an —O-heterocyclyl, and at least one hydrogen atom in heterocyclicoxy may be substituted with one of the same substituents as described above in connection with the alkyl group.

The term "sulfonyl" includes R"—SO$_2$—, wherein R" is hydrogen, alkyl, aryl, heteroaryl, aryl-alkyl, heteroaryl-alkyl, alkoxy, aryloxy, cycloalkyl, or heterocyclyl.

The term "sulfamoyl" includes H$_2$NS(O)$_2$—, alkyl-NHS(O)$_2$—, (alkyl)$_2$NS(O)$_2$—, aryl-NHS(O)$_2$—, alkyl(aryl)-NS(O)$_2$—, (aryl)$_2$NS(O)$_2$—, heteroaryl-NHS(O)$_2$—, (arylalkyl)-NHS(O)$_2$—, or (heteroaryl-alkyl)-NHS(O)$_2$—. At least one hydrogen atom in sulfamoyl may be substituted with one of the same substituents as described above in connection with the alkyl group.

The term "amino" includes compounds where a nitrogen atom is covalently bonded to at least one carbon or heteroatom. The term "amino" also includes —NH$_2$ and also includes substituted moieties.

The term also includes "alkyl amino" wherein the nitrogen is bound to at least one additional alkyl group. The term also includes "arylamino" and "diarylamino" groups wherein the nitrogen is bound to at least one or two independently selected aryl groups, respectively.

The term "alkylene", "alkenylene", "alkynylene", "arylene", and "heteroarylene" are defined as described above, except that "alkyl", "alkenyl", "alkynyl", "aryl", and "heteroaryl", which are mono-valent groups, are changed into divalent groups. At least one hydrogen atom in "alkylene", "alkenylene", "alkynylene", "arylene", and "heteroarylene" may be substituted with one of the same substituents as described above in connection with the alkyl group.

The fuel cell including the electrode with improved electrical conductive characteristics may have improved cell performance, in terms of current density. The fuel cell is suitable for use in high-temperature, non-humidified conditions.

Hereinafter, one or more embodiments of the present invention will be described in detail with reference to the following examples. These examples are not intended to limit the purpose and scope of the one or more embodiments of the present invention.

Synthesis Example 1

Preparation of Compound Represented by Formula 9

4.4 moles of formaldehyde and 2.2 moles of 2-thiophene-methylamine were mixed with 120 ml of toluene and 40 ml of N,N-dimethylformamide 40 ml, and an amount of p-toluene-sulfonic acid equivalent to a catalyst was added thereto. The mixture was reacted at about 80° C. for 1 hour, and 1 mol of bisphenol-S was added to the reacted mixture and reacted at about 120° C. for about 2 hours to obtain a crude product.

The crude product was washed twice with a 1N NaOH aqueous solution and once with distilled water, and dried with magnesium sulfate. Subsequently, the resultant was filtered and then the solvent was removed therefrom. Then, the resultant was dried under vacuum to obtain a compound represented by Formula 9 below with a yield of 80%.

Formula 9

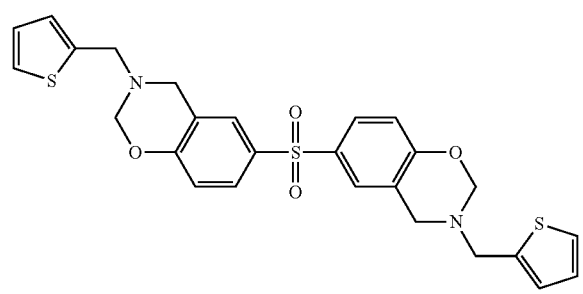

The structure of the obtained compound was identified using nuclear magnetic resonance (NMR) spectrometry. The result is shown in FIG. 1.

Synthesis Example 2

Preparation of Compound Represented by Formula 19

A compound represented by Formula 19 below was prepared in the same manner as in Synthesis Example 1, except that 4-(thiophene-3-yl)aniline represented by Formula 18 below and phenol were used, instead of 2-thiophene-methylamine and bisphenol-S, respectively.

Formula 18

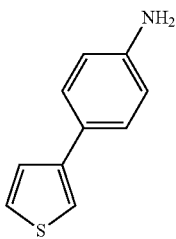

Formula 19

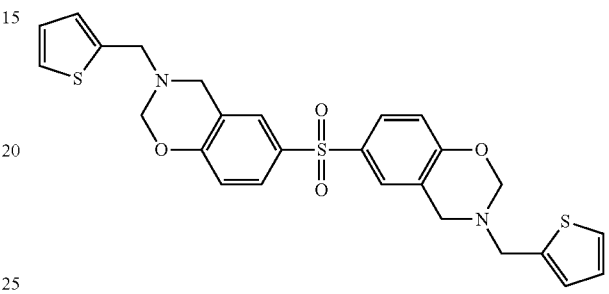

Synthesis Example 3

Preparation of Compound Represented by Formula 10

A compound represented by Formula 10 below was prepared in the same manner as in Synthesis Example 1, except that 4-(thiophene-2-yl)aniline represented by Formula 20 below was used, instead of 2-thiophene-methylamine.

Formula 20

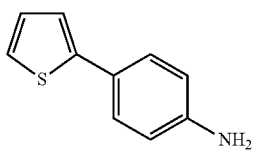

Formula 10

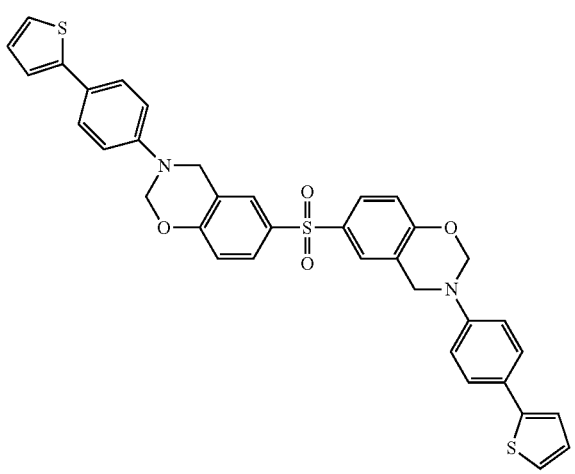

Example 1

Manufacture of Electrodes for Fuel Cells and a Fuel Cell Including the Electrodes 1 g of carbon black and 4 g of ethylene glycol were mixed together and then that mixture was mixed with a mixed solution of 0.2 g of a compound represented by Formula 9 below in 0.8 g of N-methylpyrrolidone (NMP).

[Formula 9]

The resulting mixture was tape-cast on carbon paper treated with 5 wt % of polytetrafluoroethylene, and then thermally treated at about 250° C. to form a microporous layer on the carbon paper.

Meanwhile, 1 g of a Pt/Co catalyst (45 wt % of Pt and 5 wt % of Co on carbon) and 3 g of NMP acting as a solvent were put into a stirring vessel. The mixture was stirred using a high-speed stirrer to prepare a slurry.

Next, a solution of 5 wt % of a vinylidenefluoride-co-hexafluoropropylene copolymer in NMP was added to the mixture until the amount of the vinylidenefluoride-co-hexafluoropropylene copolymer in the mixture reached 0.026 g, followed by mixing for about 10 minutes to prepare a slurry for forming a cathode catalyst layer.

The slurry for forming a cathode catalyst layer was coated on the microporous layer, and the resultant was dried at room temperature for 1 hour, dried at about 80° C. for about 1 hour, dried at about 120° C. for about 30 minutes, and dried at about 150° C. for about 15 minutes to manufacture an anode. The amount of Pt loaded in the cathode was 1.5 mg/cm$^2$.

An anode was manufactured as follows. 0.5 g of a Pt/Ru catalyst (30 wt % of Pt and 15 wt % of Ru supported on carbon) and 6 g of NMP acting as a solvent were put into a stirring vessel, and stirred using a high-speed stirrer for about two minutes. Subsequently, a solution of 0.05 g of polyvinylidenefluoride in 1 g of NMP was added to the mixture, followed by further stirring for about two minutes to prepare a slurry for forming an anode catalyst layer. The slurry for forming an anode catalyst layer was coated on carbon paper that was coated with the microporous layer, using a bar coater to manufacture a cathode. The amount of Pt loaded in the anode was 0.9 mg/cm$^2$.

Meanwhile, 65 parts by weight of a compound represented by Formula 62 below and 35 parts by weight of polybenzimidazole (m-PBI) represented by Formula 12 below were blended, and the blend was cured at a temperature of about 80° C. to about 220° C.

Formula 62

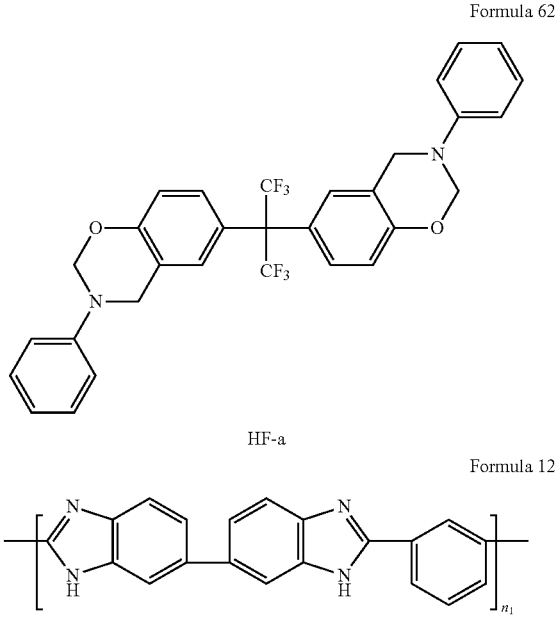

HF-a

Formula 12

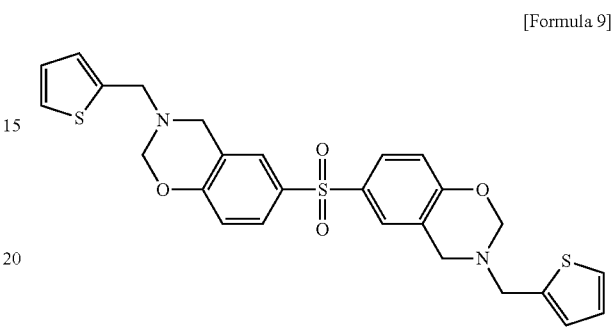

Subsequently, the resultant was impregnated with 85 wt % of phosphoric acid at about 80° C. for about 4 hours or longer to form an electrolyte membrane. The amount of the phosphoric acid was about 300 parts by weight based on 100 parts by total weight of the electrolyte membrane.

The electrolyte membrane was disposed between the cathode and the anode to manufacture a membrane-electrode assembly (MEA).

To prevent gas permeation between the cathode and the anode, a PTFE membrane main-gasket having a thickness of 200 μm and a PTFE membrane sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow rate: 250 ccm), at 150° C. under non-humid conditions on the electrolyte membrane, and characteristics of the fuel cell were measured. Based on the fact that performance of fuel cells using a phosphoric acid-doped electrolyte is improved with time, the fuel cell was activated until the operating voltage reached a peak voltage, and then the characteristics of the fuel cell were evaluated. The area of each of the cathode and the anode was set to 7.84 cm$^2$ (=2.8 cm×2.8 cm). The cathode was about 490 μm thick and the anode was about 390 μm thick.

Example 2

Manufacture of Electrodes for Fuel Cells and a Fuel Cell Including the Electrodes 1 g of carbon black and 4 g of ethylene glycol were mixed together and then that mixture was mixed with a mixed solution of 0.2 g of polytetrafluoroethylene in 0.8 g of N-methylpyrrolidone (NMP).

The resulting mixture was tape-cast on carbon paper treated with 5 wt % of polytetrafluoroethyelene, and then thermally treated at about 250° C. to form a microporous layer on the carbon paper.

Meanwhile, 1 g of a Pt/Co catalyst (45 wt % of Pt and 5 wt % of Co on carbon) and 3 g of NMP as a solvent were put into a stirring vessel. The mixture was stirred using a high-speed stirrer to prepare a slurry.

Next, a solution of the compound of Formula 9 in NMP was added to the mixture until the amount of the compound of Formula 9 in the mixture reached 0.025 g, followed by mixing for about 10 minutes to prepare a slurry for forming a cathode catalyst layer.

[Formula 9]

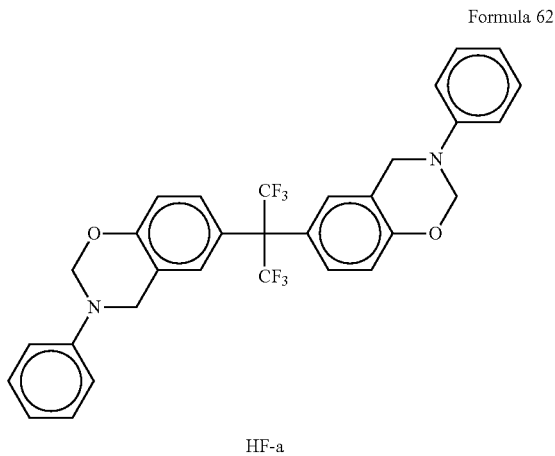

The slurry for forming the cathode catalyst layer was coated on the microporous layer, and the resultant was dried at room temperature for about 1 hour, dried at about 80° C. for about 1 hour, dried at about 120° C. for about 30 minutes, and dried at about 150° C. for about 15 minutes to manufacture a cathode. The amount of Pt loaded in the cathode was 1.5 mg/cm$^2$.

An anode was manufactured as follows. 2 g of a Pt/Ru catalyst, including 30 wt % of Pt and 15 wt % of Ru, supported on carbon, and 9 g of NMP as a solvent were put into a stirring vessel, and the mixture was stirred using a high-speed stirrer for about 2 minutes.

Subsequently, a solution of 0.05 g of polyvinylidenefluoride in 1 g of NMP was added to the mixture, followed by further stirring for about two minutes to prepare a slurry for forming an anode catalyst layer. The slurry for forming the anode catalyst layer was coated on carbon paper that was coated with the microporous layer, using a bar coater to manufacture a cathode. The amount of Pt loaded in the anode was 0.9 mg/cm$^2$.

Meanwhile, 65 parts by weight of a compound represented by Formula 62 below and 35 parts by weight of polybenzimidazole (m-PBI) represented by Formula 12 below were blended, and the blend was cured at a temperature of about 80° C. to about 220° C.

Formula 62

HF-a

Formula 12

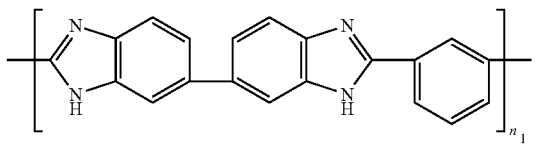

Subsequently, the resultant was impregnated with 85 wt % of phosphoric acid at about 80° C. for about 4 hours or longer to form an electrolyte membrane. The amount of the phosphoric acid was about 500 parts by weight based on 100 parts by weight of the electrolyte membrane.

The electrolyte membrane was disposed between the cathode and the anode to manufacture a membrane-electrode assembly (MEA). The cathode and the anode were not impregnated with phosphoric acid.

To prevent gas permeation between the cathode and the anode, a PTFE membrane main-gasket having a thickness of 200 μm and a PTFE membrane sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow rate: 250 ccm), at 150° C. under non-humid conditions on the electrolyte membrane, and characteristics of the fuel cell were measured. Based on the fact that performance of fuel cells using a phosphoric acid-doped electrolyte is improved with time, the fuel cell was activated until the operating voltage reached a peak voltage, and then the characteristics of the fuel cell were evaluated. The area of each of the cathode and the anode was set to 7.84 cm$^2$ (=2.8 cm×2.8 cm). The cathode was about 390 μm thick and the anode was about 390 μm thick.

Example 3

Manufacture of Electrodes for Fuel Cells and a Fuel Cell Including the Electrodes Electrodes for fuel cells and a fuel cell were manufactured in the same manner as in Example 1, except that the amount of the compound of Formula 9 was varied to 0.3 g when forming the microporous layer.

Example 4

Manufacture of Electrodes for Fuel Cells and a Fuel Cell Including the Electrodes Electrodes for fuel cells and a fuel cell were manufactured in the same manner as in Example 1, except that the amount of the compound of Formula 9 was varied to 0.4 g when forming the microporous layer.

Example 5

Manufacture of Electrodes for Fuel Cells and a Fuel Cell Including the Electrodes Electrodes for fuel cells and a fuel cell were manufactured in the same manner as in Example 1, except that, instead of the common carbon paper treated with 5 wt % of polytetrafluoroethylene, a gas diffusion layer prepared by the following process was used as the carbon paper when forming the cathode and anode.

A compound represented by Formula 9 below and N-methylpyrrolidone (NMP) were mixed to obtain 8 wt % of the compound represented by Formula 9 in NMP solution.

[Formula 9]

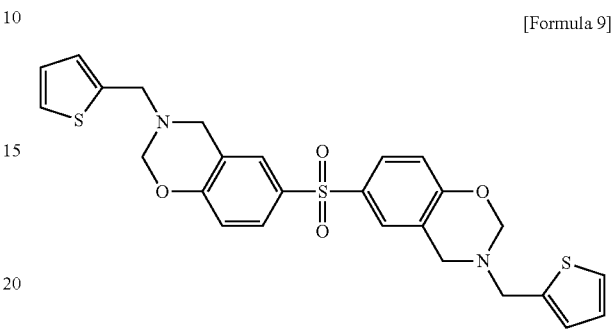

A carbon paper (Toray 060 plain) was dip-coated by 8 wt % of the compound represented by Formula 9 in NMP solution, and then the resulting carbon paper was
thermally treated at about 250° C. to form a gas diffusion layer.

1 g of carbon black and 4 g of ethylene glycol were mixed together and then were mixed with a mixed solution of 0.2 g of the compound represented by Formula 9 in 0.8 g of N-methylpyrrolidone (NMP).

The resulting mixture was tape-cast on the gas diffusion layer and then thermally treated at about 250° C. to form a microporous layer.

Comparative Example 1

Manufacture of Electrodes for Fuel Cells and a Fuel Cell Including the Electrodes Electrodes for fuel cells and a fuel cell were manufactured in the same manner as in Example 1, except that 0.3 g of polytetrafluoroethylene (PTFE) was used, instead of 0.2 g of the compound of Formula 9, when forming the microporous layer.

Comparative Example 2

Manufacture of Electrodes for Fuel Cells and a Fuel Cell Including the Electrodes Electrodes for fuel cells and a fuel cell were manufactured in the same manner as in Example 2, except that 0.3 g of polytetrafluoroethylene (PTFE) was used, instead of 0.025 g of the compound of Formula 9, when forming the anode catalyst layer.

Figure 2:
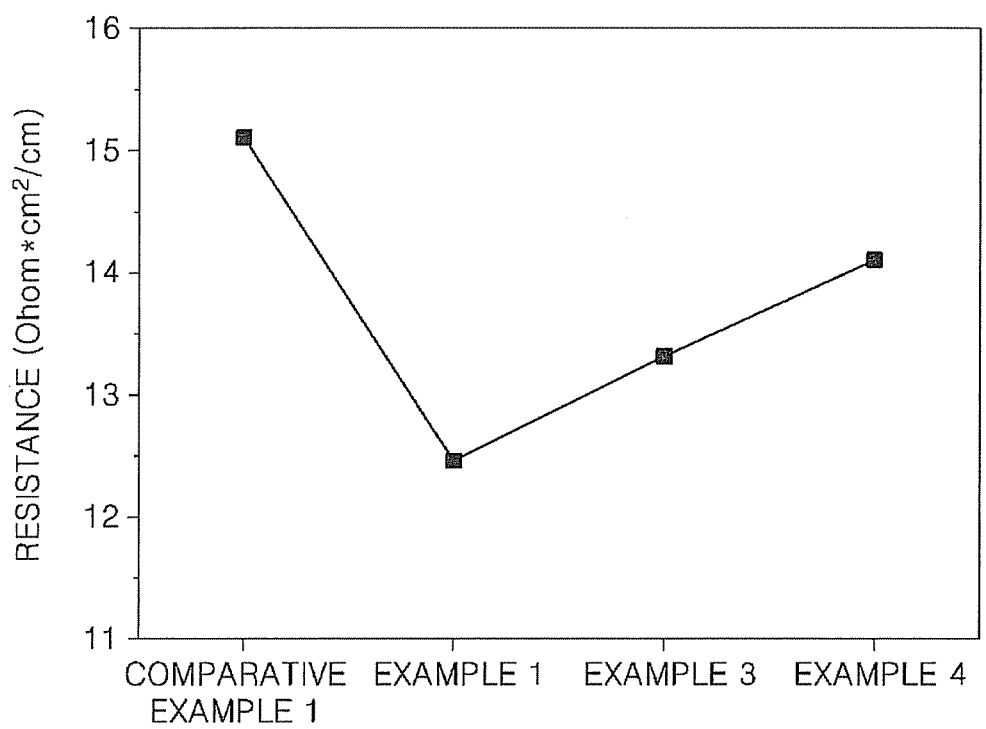
FIG. 2 is a graph illustrating the results of measuring conductivities of microporous layers formed in Examples 1, 3, 4 and Comparative Example 1.

Conductivities of the microporous layers formed in Examples 1, 3, 4 and Comparative Example 1 were measured. The results are shown in FIG. 2. Referring to FIG. 2, the microporous layers of Examples 1, 3 and 4 are found to have improved cell voltage characteristics, as compared to that of Comparative Example 1.

Figure 3:
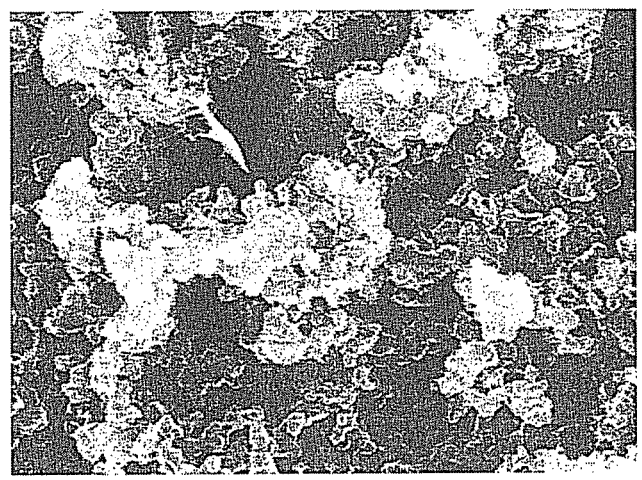
FIGS. 3 and 4 are scanning electron microscopic (SEM) images of the microporous layers of Example 3 and Comparative Example 1, respectively.
Figure 4:
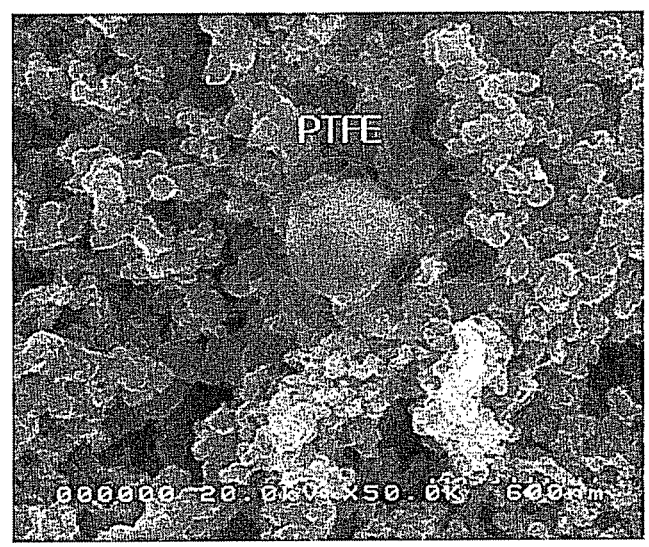

The microporous layers of Example 3 and Comparative Example 1 were analyzed using scanning electron microscopy (SEM). The results are shown in FIGS. 3 and 4, respectively. Referring to FIGS. 3 and 4, in the microporous layer of Example 3 components appear uniformly dispersed. Meanwhile, in the microporous layer of Comparative Example 1, PTFE appears agglomerated.

Figure 5:
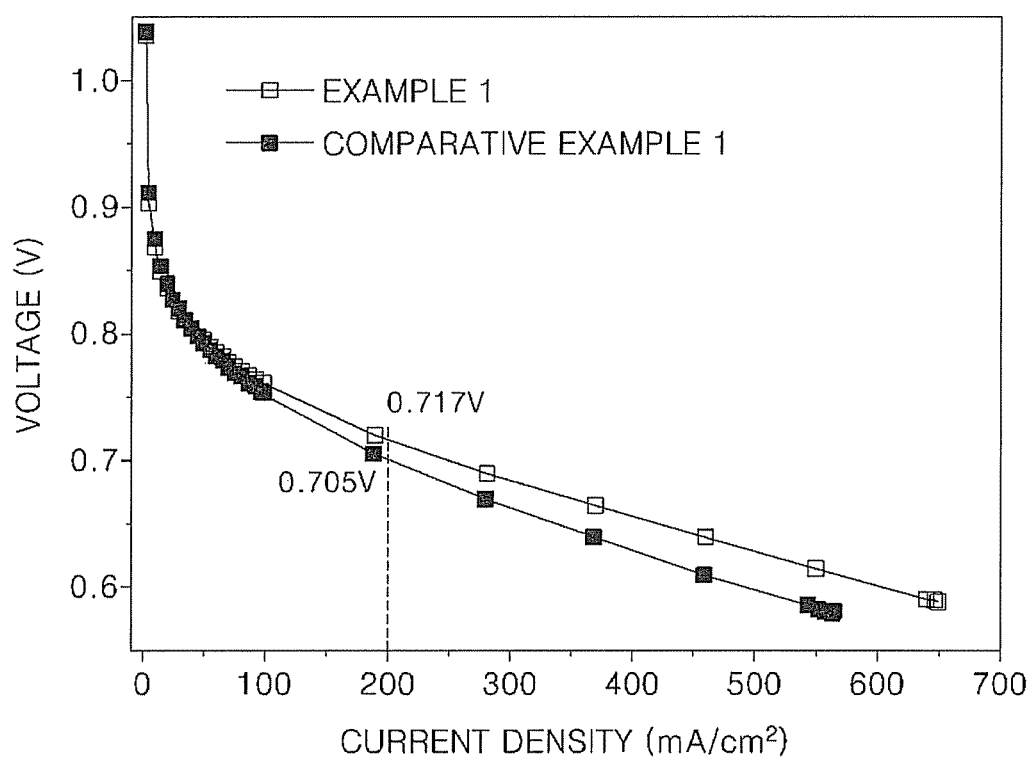
FIG. 5 is a graph of cell voltages of fuel cells manufactured in Example 1 and Comparative Example 1 with respect to current density.

Changes in cell voltages of the fuel cells manufactured in Example 1 and Comparative Example 12 with respect to current density were measured. The results are shown in FIG. 5. Referring to FIG. 5, the fuel cell of Example 1 has improved cell voltage characteristics, as compared to the fuel cell of Comparative Example 1.

Figure 6:
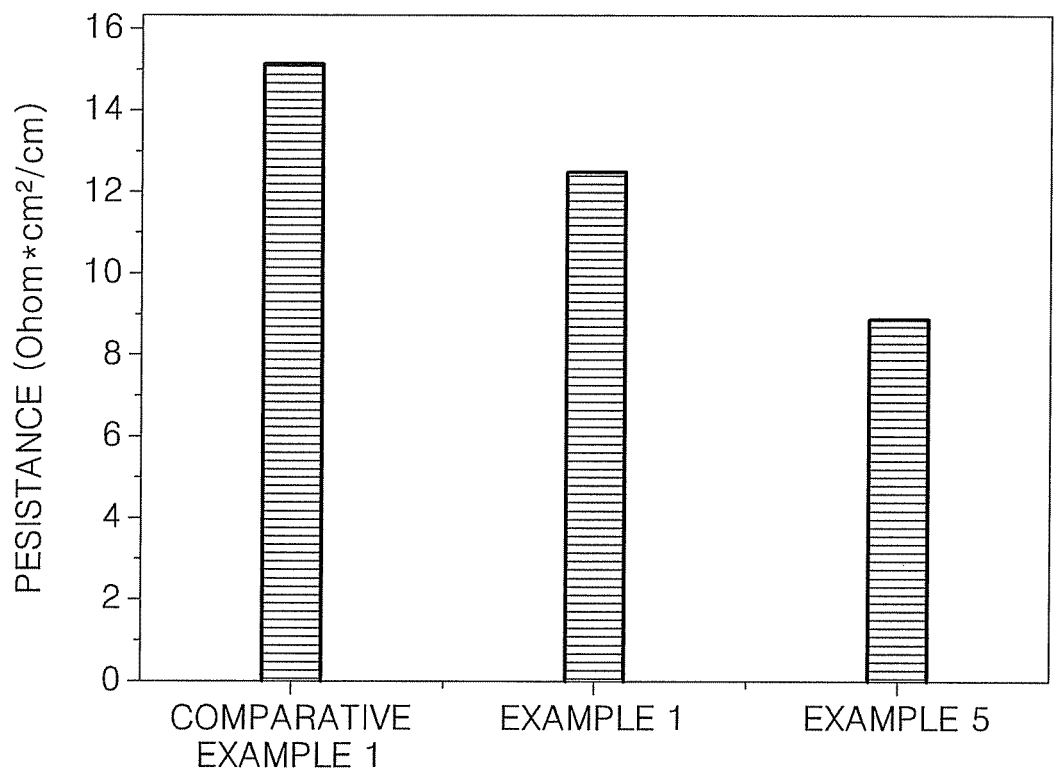
FIG. 6 is a graph illustrating the results of measuring conductivities of the microporous layers formed in Examples 1, 5 and Comparative Example 1.

Changes in conductivities of the microporous layers formed in Examples 1, 5 and Comparative Example 1 were measured. The results are shown in FIG. 6. Referring to FIG. 6, the microporous layers of Examples 1 and 5 have improved cell conductivities, as compared to the fuel cell of Comparative Example 1.

As described above, according to the one or more of the above embodiments of the present invention, a composition including a conductive functional group and a polymer that is a polymerization product of the composition may have good resistance to chemicals, heat, and acid. An electrode for fuel cells that includes the same may have improved electrical conductivity. A fuel cell with improved current density may be manufactured using the electrode.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composition comprising at least one of a compound represented by Formula 1 below and a compound represented by Formula 2 below; and a cross-linkable compound:

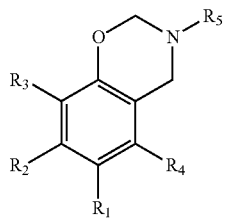

Formula 1

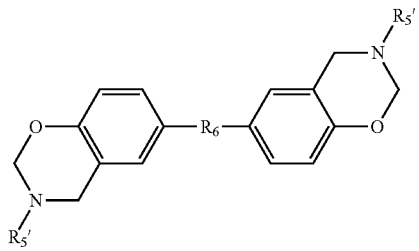

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and

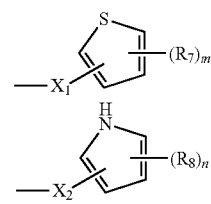

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3;

wherein $R_5$ and $R_5'$ are each independently one of the groups represent by Formulae 5A-5C below:

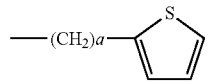

Formula 5A

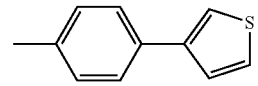

Formula 5B

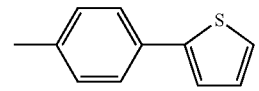

Formula 5C wherein, in Formula 5A, a is a number from 1 to 5.

2. The composition of claim 1, wherein the compound of Formula 2

Formula 6
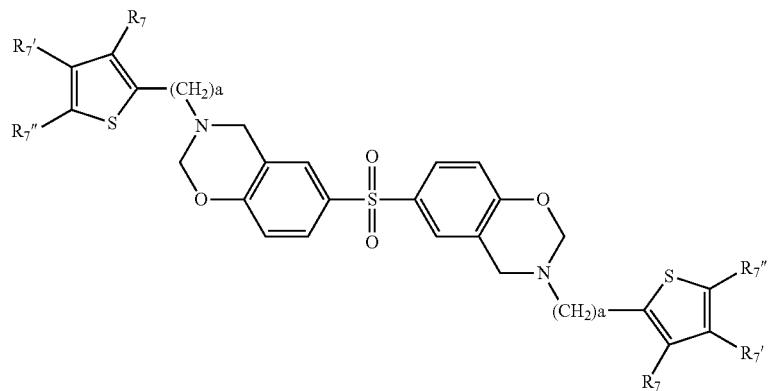
Formula 7
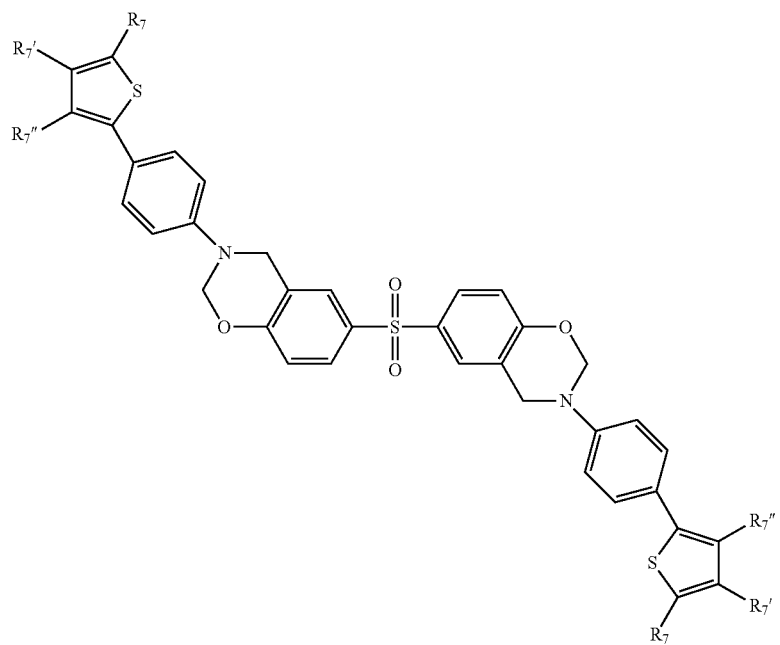
Formula 8
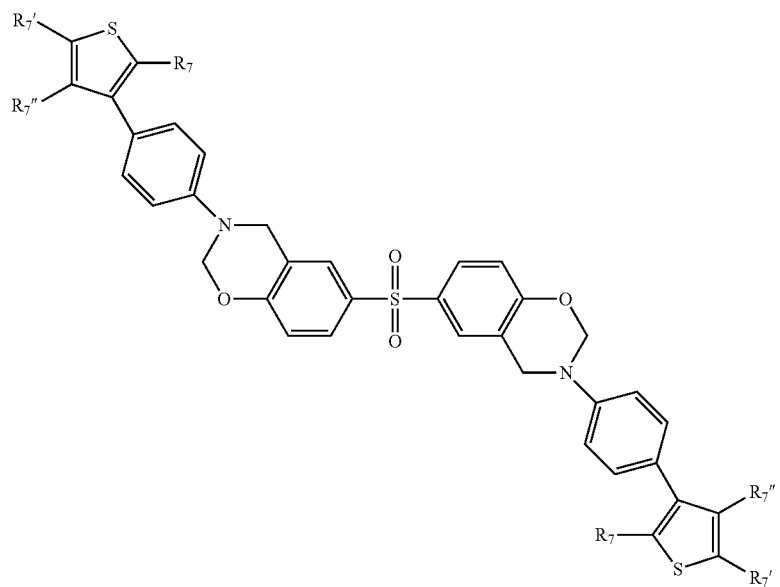

wherein, in Formulae 6 to 8, $R_7$, $R_7'$ and $R_7''$ are each independently a hydrogen atom, a $C_1$-$C_{20}$ alkyl group, a $C_6$-$C_{20}$ aryl group, a $C_2$-$C_{20}$ heteroaryl group, a $C_2$-$C_{20}$ heteroaryloxy group, a $C_4$-$C_{20}$ carbocyclic group, a $C_2$-$C_{20}$ heterocyclic group, a halogen atom, a hydroxyl group, or a cyano group; and a is an integer from 1 to 5.

3. The composition of claim 1, wherein the compound of Formula 2 is selected from the compounds represented by Formulae 9 to 11, and 19 below:

Formula 9

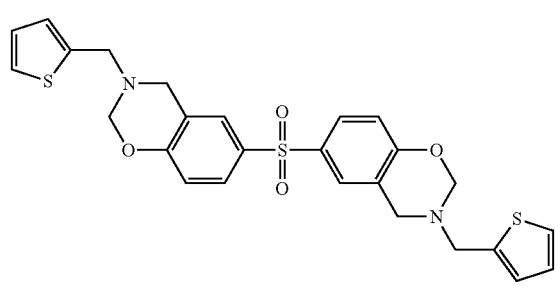

Formula 10

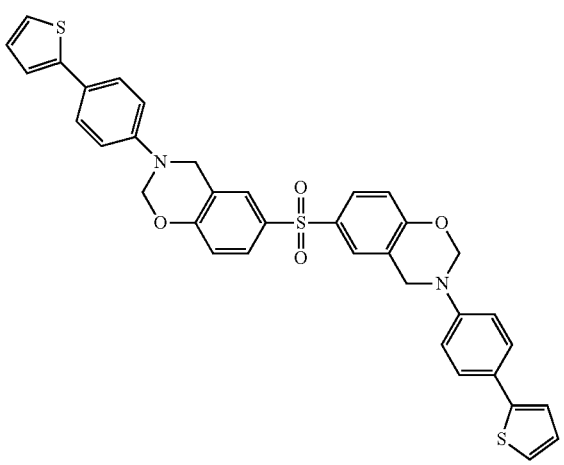

Formula 11

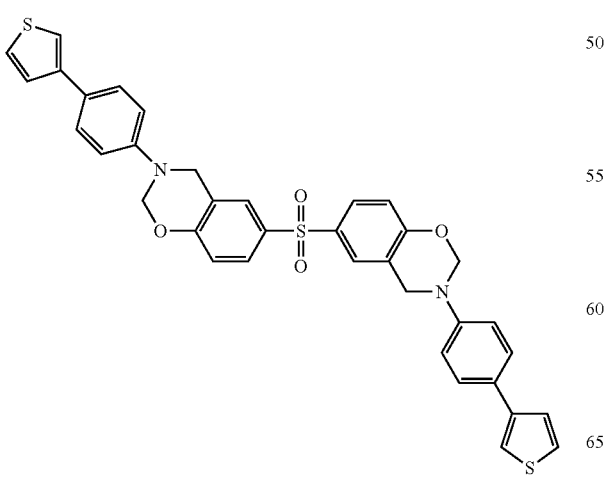

Formula 19

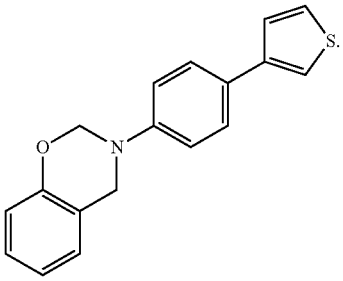

4. The composition of claim 1, wherein the cross-linkable compound is at least one material selected from the group consisting of a polyazole-based material, polyimide and polyoxazole.

5. The composition of claim 1, wherein the amount of the cross-linkable compound is from about 5 parts to about 210 parts by weight based on 100 parts by weight of the compounds of Formulae 1 and 2.

6. The composition of claim 1, wherein the cross-linkable compound comprises at least one compound selected from among the compounds represented by Formulae 12 to 14 below:

Formula 12

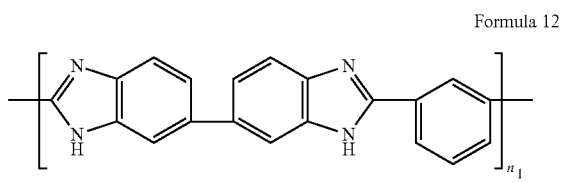

wherein, in Formula 12, $n_1$ is an integer of 10 or greater;

Formula 13

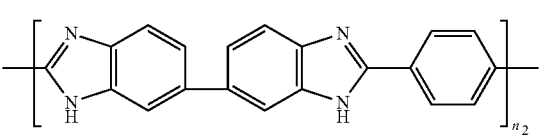

wherein, in Formula 13, $n_2$ is an integer of 10 or greater,

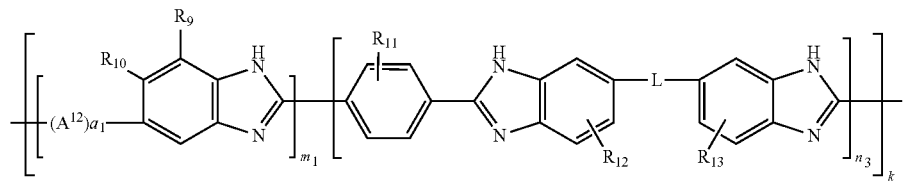

Formula 14 wherein, in Formula 14, $R_9$ and $R_{10}$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, wherein $R_9$ and $R_{10}$ may be linked to form a $C_4$-$C_{20}$ carbocyclic group or a $C_3$-$C_{20}$ heterocyclic group;

$Ar^{12}$ is a substituted or unsubstituted $C_6$-$C_{20}$ arylene group or a substituted or unsubstituted $C_3$-$C_{20}$ heteroarylene group;

$R_{11}$ to $R_{13}$ are each independently a mono- or a multi-substituted substituent selected from the group consisting of a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, or a substituted or unsubstituted $C_3$-$C_{20}$ heteroaryloxy group;

L represents a linker;

$m_1$ is from 0.01 to 1;

$a_1$ is 0 or 1;

$n_3$ is a number from 0 to 0.99; and k is a number from 10 to 250.

7. A polymer that is a polymerization product of the composition of claim 1.

8. A method of preparing a composition including at least one of a compound represented by Formula 1 below and a compound represented by Formula 2 below, the method comprising thermally treating a mixture of a phenol compound (A) below, formaldehyde, an amine compound (B) below, an aprotic polar solvent and an organic solvent to obtain the at least one of the compounds of Formulae 1 and 2:

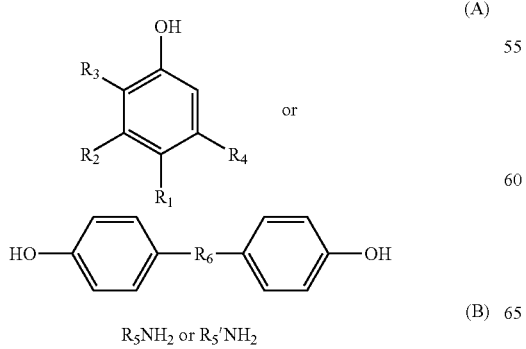

-continued

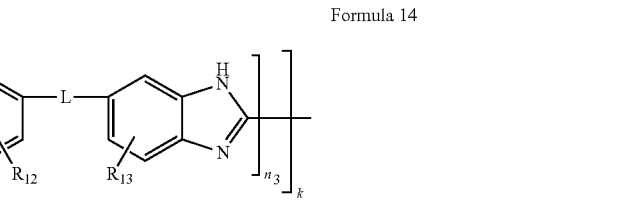

Formula 1

Formula 2 wherein, in Formulae 1 and 2 and in the formulae of the phenol compound (A) and the amine compound (B), $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxy group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and

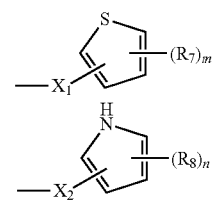

$R_5$ and $R_5'$ are each independently one of the groups represented by Formulae 5A-5C below:

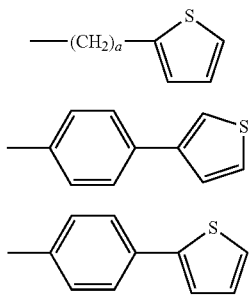

wherein, in the Formula 5A, a is a number from 1 to 5;

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

9. The method of claim 8, wherein the mixing ratio of the aprotic polar solvent to the organic solvent is from about 1:9 to about 9:1.

10. The method of claim 8, wherein the aprotic polar solvent is at least one solvent selected from the group consisting of N,N'-dimethylformamide, N,N'-diacetamide, N-methylpyrrolidone, tetraethylenesulfone, 1,2-dimethyl-2-imidazolidinone, and N-methylformamide.

11. The method of claim 8, wherein the organic solvent comprises at least one solvent selected from among 1,4-dioxane, chloroform, dichloromethane, tetrahydrofuran (THF), a benzene-based solvent, and a mixture thereof.

12. The method of claim 8, wherein the organic solvent is at least one benzene-based solvent selected from the group consisting of benzene, toluene and xylene.

13. The method of claim 8, wherein at least one catalyst selected from among p-toluenesulfonic acid, phosphorus pentachloride ($PCl_5$), and phosphoryl chloride ($POCl_3$) is further added when the phenol compound (A), the formaldehyde, and the amine compound (B) are mixed together.

14. The method of claim 8, wherein the thermal treating is performed at a temperature of about 80° C. to about 25° C.

15. An electrode of a fuel cell, the electrode comprising a composition including at least one of a compound represented by Formula 1 below and a compound represented by Formula 2 below:

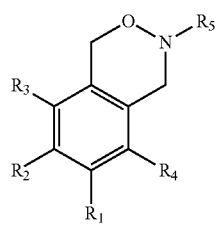

Formula 1

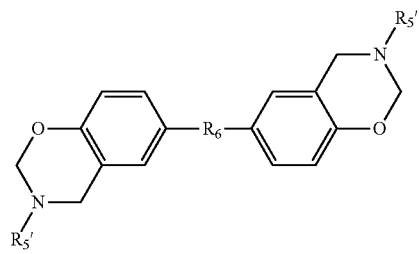

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—;

wherein $R_5$ and $R_5'$ are each independently one of the groups represent by Formulae 5A-5C below:

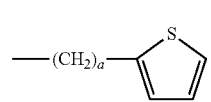

Formula 5A

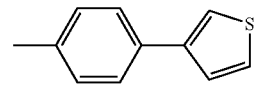

Formula 5B

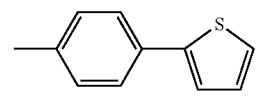

Formula 5C wherein, in Formula 5A, a is a number from 1 to 5;

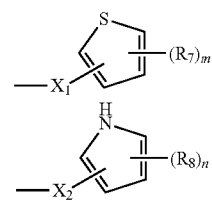

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

16. The electrode of claim 15, further comprising a cross-linkable compound.

17. The electrode of claim 16, wherein the cross-linkable compound is at least one material selected from the group consisting of a polyazole-based material, polyimide and polyoxazole.

18. The electrode of claim 16, wherein the amount of the cross-linkable compound is from about 5 parts to about 210 parts by weight based on 100 parts by weight of the compounds of Formulae 1 and 2.

19. An electrode of a fuel cell, the electrode comprising a polymer that is a polymerization product of a composition including at least one of a compound represented by Formula 1 below and a compound represented by Formula 2 below:

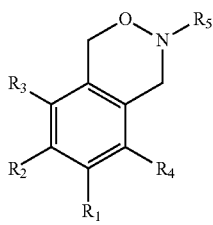

Formula 1

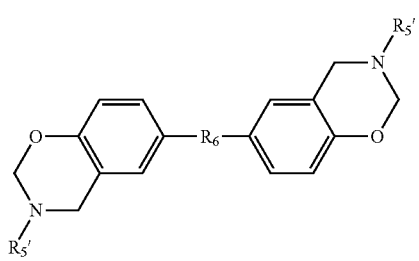

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and wherein $R_5$ and $R_5'$ are each independently one of the groups represent by Formulae 5A-5C below:

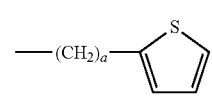

Formula 5A

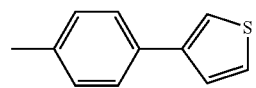

Formula 5B

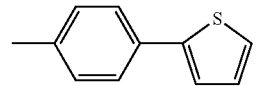

Formula 5C wherein, in Formula 5A, a is a number from 1 to 5;

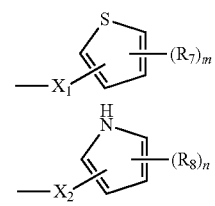

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

20. The electrode of claim 19, wherein the electrode further comprises at least one of a gas diffusion layer and a microporous layer and a catalyst layer; and the at least one of the gas diffusion layer, the microporous layer and the catalyst layer comprises the polymer.

21. The electrode of claim 20, wherein the microporous layer comprises a conductive material, and the amount of the polymer in the microporous layer is from about 0.1 parts to about 0.5 parts by weight based on 1 part by weight of the conductive material.

22. The electrode of claim 20, wherein the microporous layer has an electrical resistance of about 12 Ωcm²/cm to about 14 Ωcm²/cm.

23. The electrode of claim 20, wherein the catalyst layer comprises a catalyst, and the amount of the polymer in the catalyst layer is from about 0.001 parts to about 0.5 parts by weight based on 1 part by weight of the catalyst.

24. The electrode of claim 19, wherein the electrode further comprises a gas diffusion layer, a microporous layer, and a catalyst layer;

and the gas diffusion layer and the microporous layer comprise the polymer.

25. The electrode of claim 19, further comprising a cross-linkable compound.

26. The electrode of claim 25, wherein the cross-linkable compound is at least one material selected from the group consisting of a polyazole-based material, polyimide and polyoxazole.

27. An electrolyte membrane of a fuel cell, the electrolyte membrane comprising a polymer obtained from polymerization of a composition including at least one of a compound represented by Formula 1 below and a compound represented by Formula 2 below:

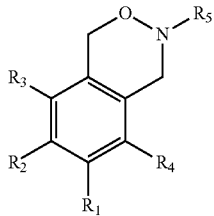

Formula 1

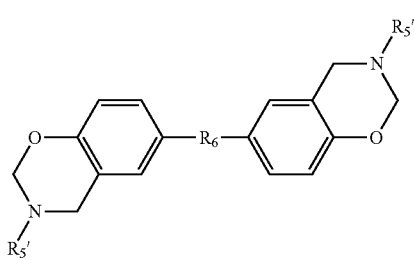

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and $R_5$ and $R_5'$ are each independently selected from the group consisting of a group represented by Formula 3 below, a group represented by Formula 4 below, —S≡N, and —C≡CH,

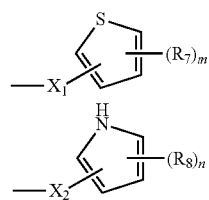

in Formulae 3 and 4, $X_1$ and $X_2$ are each independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

28. The electrolyte membrane of claim 27, further comprising a cross-linkable compound.

29. The electrolyte membrane of claim 28, wherein the cross-linkable compound is at least one material selected from the group consisting of a polyazole-based material, polyimide and polyoxazole.

30. A fuel cell comprising:
a cathode;
an anode; and
an electrolyte membrane between the cathode and the anode,
wherein at least one of the cathode, the anode and the electrolyte membrane comprises a composition including at least one of a compound represented by Formula 1 below and a compound represented by Formula 2 below:

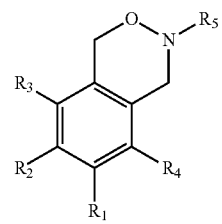

Formula 1

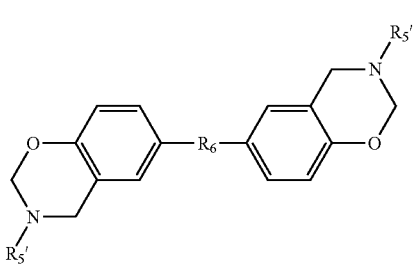

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—; and $R_5$ and $R_5'$ are each independently selected from the group consisting of a group represented by Formula 3 below, a group represented by Formula 4 below, —S≡N, and —C≡CH,

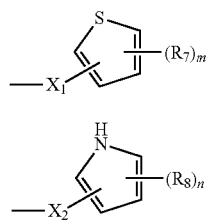

Formula 3

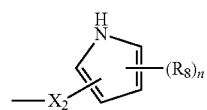

Formula 4 wherein, in Formulae 3 and 4, $X_1$ and $X_2$ are each independently a substituted or unsubstituted $C_1$-$C_{20}$ alkylene group, a substituted or unsubstituted $C_6$-$C_{20}$ arylene group, or a substituted or unsubstituted $C_2$-$C_{20}$ heteroarylene group;

$R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

31. The fuel cell of claim 30, further comprising at least one cross-linkable compound selected from the group consisting of a polyazole-based material, polyimide and polyoxazole.

32. A fuel cell comprising:

a cathode;

an anode; and an electrolyte membrane between the cathode and the anode, wherein at least one of the cathode, the anode and the electrolyte membrane comprising a polymer that is a polymerization product of a composition including at least one of a compound represented by Formula 1 below and a compound represented by Formula 2 below:

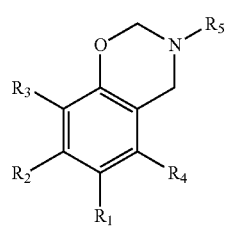

Formula 1

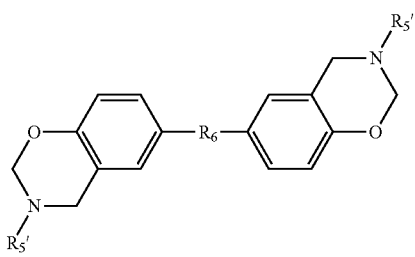

Formula 2 wherein, in Formulae 1 and 2, $R_1$ to $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group;

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—;

$R_5$ and $R_5'$ are each independently selected from the group consisting of a group represented by Formula 3 below, a group represented by Formula 4 below, —S≡N, and —C≡CH,

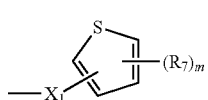

Formula 3

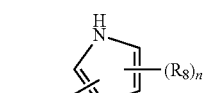

Formula 4 wherein, in Formulae 3 and 4, $X_1$ and $X_2$ are each independently a $C_1$-$C_{20}$ alkylene group, a $C_6$-$C_{20}$ arylene group, or a $C_2$-$C_{20}$ heteroarylene group, $R_7$ and $R_8$ are each independently a hydrogen atom, a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, a halogen atom, a hydroxyl group, an amino group, or a cyano group; and m and n are each independently an integer from 0 to 3.

33. The fuel cell of claim 32, further comprising at least one cross-linkable compound selected from the group consisting of a polyazole-based material, polyimide and polyoxazole.

* * * * *